(12) United States Patent
Obata et al.

(10) Patent No.: US 9,721,408 B2
(45) Date of Patent: Aug. 1, 2017

(54) CONTROL APPARATUS FOR VEHICLE OPENING/CLOSING BODY

(71) Applicant: Nissan Motor Co., Ltd., Kanagawa (JP)

(72) Inventors: Takayuki Obata, Kanagawa (JP); Ryuichi Yoshida, Guangzhou (CN); Masanari Ueda, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 44 days.

(21) Appl. No.: 14/425,906

(22) PCT Filed: Aug. 14, 2013

(86) PCT No.: PCT/JP2013/071940
§ 371 (c)(1),
(2) Date: Mar. 4, 2015

(87) PCT Pub. No.: WO2014/041955
PCT Pub. Date: Mar. 20, 2014

(65) Prior Publication Data
US 2015/0254913 A1 Sep. 10, 2015

(30) Foreign Application Priority Data

Sep. 12, 2012 (JP) ................................. 2012-200201

(51) Int. Cl.
*B60R 25/00* (2013.01)
*G07C 9/00* (2006.01)
(Continued)

(52) U.S. Cl.
CPC .......... *G07C 9/00126* (2013.01); *B60R 16/02* (2013.01); *B60R 25/20* (2013.01);
(Continued)

(58) Field of Classification Search
CPC ............ B60R 25/00; G07C 9/00; H04L 29/06
(Continued)

(56) References Cited

U.S. PATENT DOCUMENTS 6,476,517 B1 * 11/2002 Okada ................... B60R 25/245
307/10.1
6,542,071 B1 * 4/2003 Ohtsubo ............. B60R 25/2036
340/10.1
(Continued)

FOREIGN PATENT DOCUMENTS

JP 2002-152010 A 5/2002
JP 2008002095 A 1/2008
(Continued)

OTHER PUBLICATIONS

International Search Report issued in PCT/JP2013/071940 mailed on Sep. 24, 2013 (2 pages).

*Primary Examiner* — Nam V Nguyen
(74) *Attorney, Agent, or Firm* — Osha Liang LLP

(57) ABSTRACT

A control apparatus for a vehicle opening/closing member that operates the opening/closing member provided in the vehicle in response to a physical expression of a user, having a user authentication unit that authenticates a user whose physical expression is to be detected, a physical expression detecting unit that detects the physical expression of the user, an operation determining unit that determines an operating state of at least one of the user authentication unit and the physical expression detecting unit, and a notification unit that sends notification that, in accordance with a determination result of the operating state determined by the operation determining unit, the user has been authenticated, the detection of the physical expression has been completed, or the detection of the physical expression has failed.

19 Claims, 14 Drawing Sheets

(51) Int. Cl.
*H04L 29/06* (2006.01)
*H04N 7/18* (2006.01)
*E05B 65/12* (2006.01)
*E05F 15/00* (2015.01)
*G06F 17/00* (2006.01)
*B60R 16/02* (2006.01)
*E05F 15/73* (2015.01)
*E05F 15/76* (2015.01)
*B60R 25/20* (2013.01)

(52) U.S. Cl.
CPC .............. *E05F 15/73* (2015.01); *E05F 15/76* (2015.01); *G07C 9/00309* (2013.01); *E05F 2015/767* (2015.01); *E05Y 2400/81* (2013.01); *E05Y 2400/814* (2013.01); *E05Y 2400/822* (2013.01); *E05Y 2400/852* (2013.01); *E05Y 2400/86* (2013.01); *E05Y 2900/50* (2013.01); *G07C 2009/00793* (2013.01); *G07C 2209/64* (2013.01)

(58) Field of Classification Search
USPC .............. 340/5.72, 5.61, 5.64, 7.58; 348/77; 292/221, 226
See application file for complete search history.

(56) References Cited

U.S. PATENT DOCUMENTS

| | | | | |
|---|---|---|---|---|
| 6,993,157 | B1* | 1/2006 | Oue | B60R 25/2045 348/169 |
| 8,228,166 | B2* | 7/2012 | Eberhard | B60R 25/2036 340/5.61 |
| 8,284,020 | B2* | 10/2012 | Ghabra | B60R 25/245 340/5.61 |
| 8,451,087 | B2* | 5/2013 | Krishnan | B60J 5/04 292/221 |
| 8,638,939 | B1* | 1/2014 | Casey | G06F 21/36 380/277 |
| 8,717,429 | B2* | 5/2014 | Giraud | E05B 81/78 348/77 |
| 9,050,943 | B2* | 6/2015 | Muller | B60R 25/246 |
| 9,119,068 | B1* | 8/2015 | Hubble | H04W 12/06 |
| 2002/0152010 | A1 | 10/2002 | Colmenarez et al. | |
| 2009/0315675 | A1* | 12/2009 | Yokota | G06F 21/32 340/5.83 |
| 2011/0242303 | A1 | 10/2011 | Giraud et al. | |
| 2012/0249291 | A1* | 10/2012 | Holcomb | G07C 9/00563 340/5.51 |
| 2013/0318581 | A1* | 11/2013 | Counterman | H04W 12/06 726/7 |
| 2013/0335640 | A1* | 12/2013 | Watanabe | G06F 3/017 348/744 |
| 2014/0033292 | A1* | 1/2014 | Moore | G06F 21/35 726/9 |
| 2014/0324298 | A1* | 10/2014 | Reime | G01V 8/20 701/49 |

FOREIGN PATENT DOCUMENTS

| | | |
|---|---|---|
| JP | 2009-215826 A | 9/2009 |
| JP | 2011-242303 A | 12/2011 |
| JP | 2012-121386 A | 6/2012 |

* cited by examiner

FIG. 4
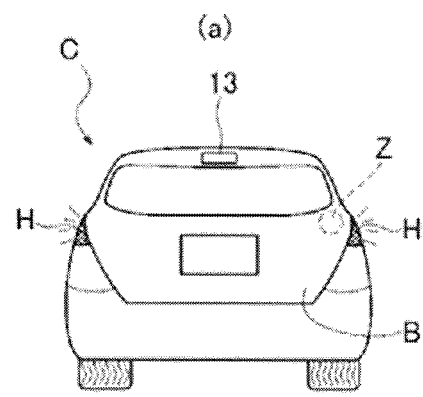
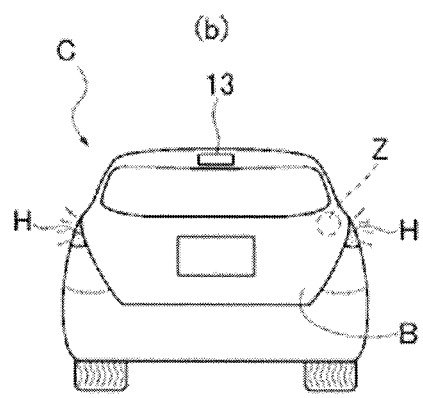
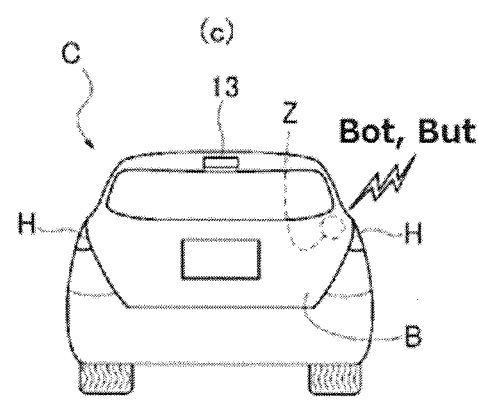
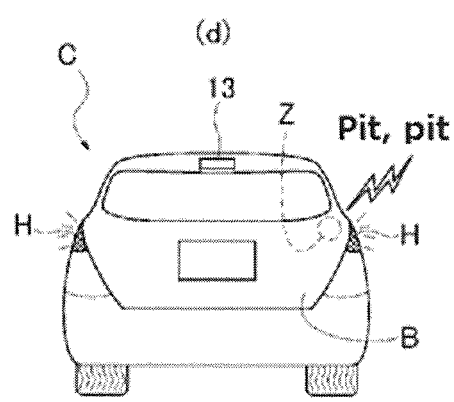
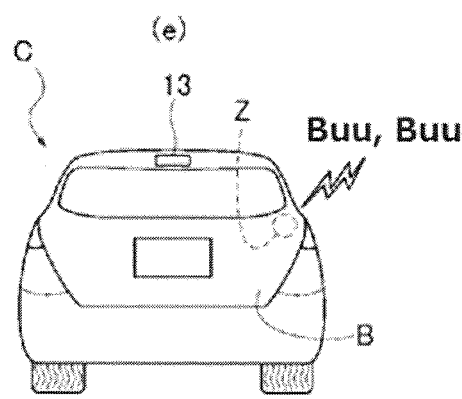

CONTROL APPARATUS FOR VEHICLE OPENING/CLOSING BODY

CROSS-REFERENCE TO RELATED APPLICATIONS

The present application claims priority based on Japanese Patent Application 2012-200201 filed in the Japanese Patent Office on Sep. 12, 2012, the entire disclosure of which is incorporated herein by reference in its entirety.

BACKGROUND

Technical Field

The present invention relates to a control apparatus for a vehicle opening/closing body based on the physical representation or expression of a user to operate the opening/closing body provided in the vehicle.

Related Art

Conventionally, a control apparatus for a vehicle opening/closing body is known in which the user's intention is determined from the body representation such as the line of sight, gestures of the user to operate a selected opening/closing body a vehicle (for example, see Patent Document 1). In the control apparatus of the vehicle opening/closing body, the physical representation of the user is recognized and, upon determining the opening/closing body to be operated, an advance notice is given to the user that the opening/closing body will be operated or actuated.

Patent Document: Japanese Patent Application Publication No. 2008-2095

SUMMARY

However, in the conventional control apparatus for a vehicle opening/closing member, during the period for determining the opening/closing member to be operated, when no determination is made as to the object opening/closing member for some reasons (for example, due to physical expression being undetectable, the apparatus malfunctioning because of own detects, and the like), the control apparatus proceeds to a normal, smart entry system without issuing an operation notification. In this case, a situation arises for the user in which, despite expressing the physical representation, no operation notification is given and the operation of the opening/closing member is not performed. Therefore, the user is inclined to repeat the physical expression unnecessarily or to change his or her position relative to the vehicle, which may result in a confusing situation because of inability of understanding why the operation notification of the opening/closing member is not made.

A control apparatus for a vehicle opening/closing member according to one or more embodiments of the present invention allows the user to grasp the operation process up until the operation of the opening/closing member so that the user may be prevented from being puzzled.

In a control apparatus for a vehicle opening/closing member according to one or more embodiments of the present invention, based on the physical representation of the user, the opening/closing body or member provided in the vehicle is operable, and a user authentication unit, a physical representation detecting unit, an actuation determining unit, and a notification unit are provided.

The user authentication unit authenticates the user making a physical expression or representation to be detected. The physical expression detecting unit detects a physical expression or representation of the user. The operation determining unit determines an operating state of at least one of the user authentication unit or the physical expression detecting unit. The notification unit notifies a determination result of the operating state by the operation determining unit.

In a control apparatus for a vehicle opening/closing member according to one or more embodiments of the present invention, the operating state of at least one of the user authentication unit and the physical expression detecting unit is determined by the operation determining unit, and a determination result is notified or informed by the notification unit.

Therefore, the user is allowed to be aware of understanding the operating state of at least one of the user authentication unit and the physical expression detecting unit.

That is, the user can grasp the state of the operating process until the opening/closing member will be operated. Then, even when the operation of the opening/closing member is not performed, since the user grasps the state of the operation process up until the opening/closing is performed, the user is able to understand what to do and prevented from being puzzled by making the repeated physical expressions unnecessarily.

BRIEF DESCRIPTION OF DRAWINGS

FIG. 4 is an explanatory diagram showing an example of notification in the control apparatus for a vehicle opening/closing member in the first embodiment;

DETAILED DESCRIPTION

A description is given below of embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A configuration of the control apparatus for a vehicle opening/closing member in the first embodiment will now be described in "Configuration of the control apparatus for a vehicle opening/closing member", "Configuration in the door operation control process", "Configuration of a first stage notification process", and "Configuration of a second stage notification process", separately.

[Configuration of the Control Apparatus of Opening/Closing Member]

Figure 1:
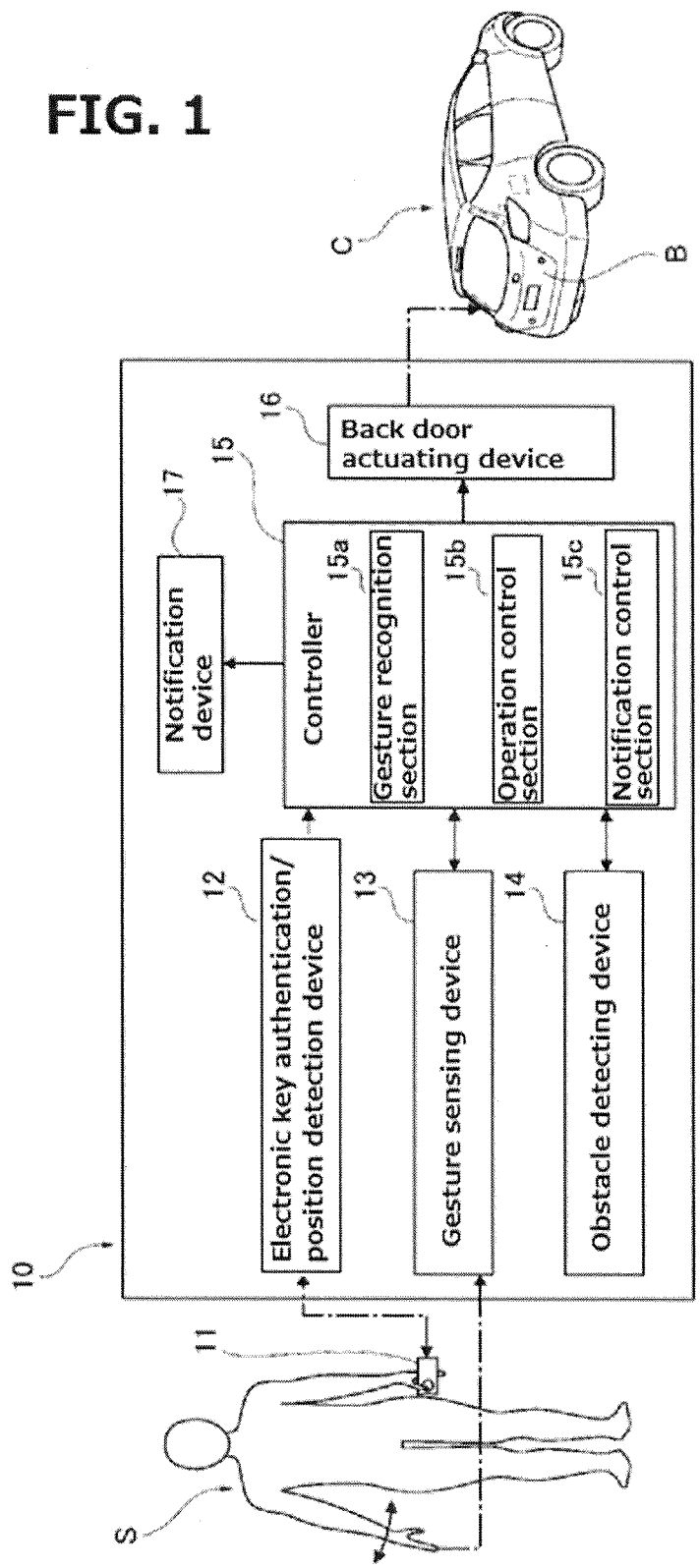
FIG. 1 is a block diagram of a control apparatus for a vehicle opening/closing member in a first embodiment.
Figure 2:
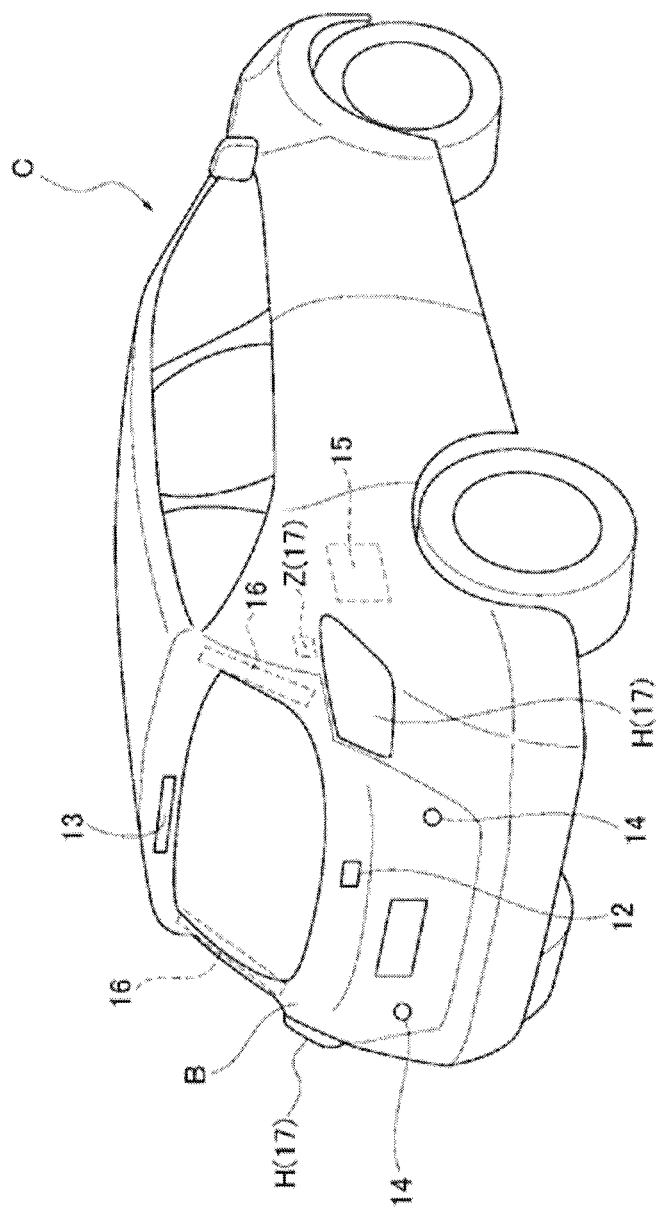
FIG. 2 is an external perspective view showing a vehicle employing a control apparatus of a vehicle opening/closing member in the first embodiment.
Figure 3:
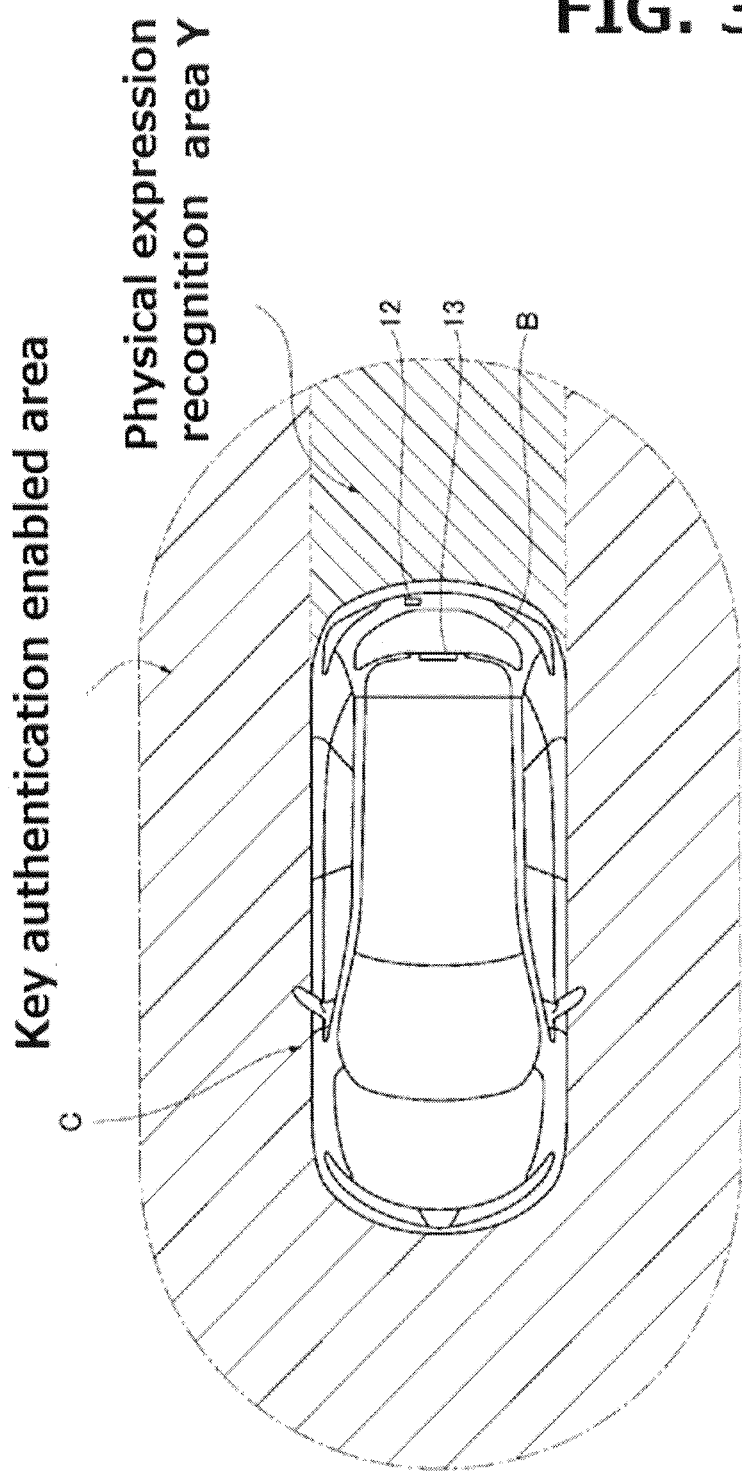
FIG. 3 is an explanatory diagram showing a key authentication enabled area and a physical expression recognition are in the control apparatus for a vehicle opening/closing member in the first embodiment.

FIG. 1 is a block diagram of a control apparatus for a vehicle opening/closing member in the first embodiment. FIG. 2 is an external perspective view showing a vehicle employing a control apparatus for a vehicle opening/closing member in the first embodiment. FIG. 3 is an explanatory diagram showing a key authentication enabled area and a physical expression recognition area in the control apparatus for a vehicle opening/closing member in the first embodiment. FIG. 4 is an explanatory diagram showing an example of notification in the control apparatus for a vehicle opening/closing member in the first embodiment. A description is given below of the configuration of the control apparatus for the opening/closing member.

A control apparatus 10 for a vehicle opening/closing member in the first embodiment performs an unlocking operation and opening operation of a back door B (opening/closing member) provided in a motor vehicle C (vehicle), based on the physical expression of a user S (operator)) who carries an electronic key 11 (portable device).

The control apparatus 10 of the vehicle opening/closing member is provided with, as shown in FIG. 1, an electronic key authentication/position detection device 12, a gesture detecting device 13, an obstacle detecting sensor 14, a controller 15, a back door actuating device 16, and a notification device 17, respectively.

The electronic key authentication/position detection device 12 is provided on the back door B of the motor vehicle C, and set to power ON in the parking state of the motor vehicle C. Further, by performing a wireless or radio communication multiple times with the electronic key 11 which is present within a key authentication enabled area X hatched in FIG. 3, the portable electronic key 11 borne by the user S is authenticated. Further, based on the information regarding radio signal strength and directivity obtained by a plurality of times of radio communications, the position of the electronic key 11 in the key authentication enabled area X is detected. Here, in addition to authenticating the electronic key 11 carried by the user S, when the electronic key is present in the physical expression authentication area Y within the key authentication enabled area X, the user S is authenticated as the "user who makes a physical expression to be detected".

Thus, the electronic key authentication/position detection device 12 corresponds to a user authentication unit including a portable device authentication section and a portable device position detecting section to authenticate a user S whose physical expression is to be detected. In addition, the key authentication information and the key position information obtained by the electronic key authentication/position detection device 12 are inputted to the controller 15.

The gesture sensing device 13 is formed in a CCD camera provided at the top of the back door B of the motor vehicle C and obtains image information by image capturing the physical expression of the user S. That is, the gesture sensing device 13 corresponds to the physical expression detecting unit for detecting a physical expression or representation of the user S. The image information obtained by the gesture sensing device 13 is input to controller 15. Note that the "physical expression or representation" is a gesture with the body of the user S and it is assumed here a great up and down movement of the right arm/hand.

The obstacle detecting sensor 14 is provided at the back door B of the motor vehicle C and senses an obstacle in the operating area of the back door. The obstacle information obtained by the obstacle detecting sensor 14 is input to the controller 15. It should be noted that this "obstacle information" includes both types of information indicating obstacle presence indicative information as well as obstacle absence indicative information.

The controller 15 calculates the user's intention S based on the key authentication/position information from the electronic key authentication/position detecting device 12, the image information from the gesture sensing device 13, and the obstacle information from the obstacle detecting sensor 14, and outputs a door operation signal to the back door actuating device 16 as well as a notification signal to the notification device 17. The controller 15 is set to the power OFF in the parking condition of the motor vehicle C. Then, when the key authentication information is input from the electronic key authentication/position detecting device 12, the controller is set to the power ON. The controller 15 has a gesture recognition section 15a, an operation control section 15b, and a notification control unit 15c.

The gesture recognition section 15a determined, based on the input key authentication information and the input key position information whether or not the authenticated electronic key 11 is present within a predetermined physical expression recognition area Y. Further, when it is determined that the authenticated electronic key 11 is present within the predetermined physical expression recognition area Y, an expression detection signal instructing to image capture the user S is output to the gesture sensing device 13. It should be noted that the fact that "the electronic key 11 is present in the physical expression recognition area Y" means that the user S is present in the area in which the physical expression may be detected.

Further, the gesture sensing device 13 is driven by the expression detection signal being input. The gesture recognition section 15a compares the image information input from the gesture sensing device 13 with a determination physical expression previously stored (or registered) in the register. Then, according to this comparison result, it is determined whether or not to recognize the physical expression of a user S. In other words, this gesture recognition section 15a corresponds to the expression recognition unit that recognizes or acknowledges the physical expression detected by the gesture sensing device 13.

The gesture recognition section 15a output a comparison completion signal after the comparison between the determination physical expression and the image information has been completed (i.e. the comparison result has been output). In addition, when determined to recognize the physical expression of the user S, a recognition signal is output while, when determined not to recognize or certify the physical expression of the user S, a non-recognition signal or recognition failure signal will be output. The expression detection signal, the comparison completion signal, and the non-recognition signal from the gesture recognition section 15a are input to the notification control unit 15c. Also, the recognition signal is input to the operation control section 15b and the notification control section 15c.

The operation control section 15b, once the recognition signal has been input from the gesture recognition section 15a, outputs to an obstacle detecting sensor 14 an obstacle detection signal to instruct to detect an obstacle. Then, when the obstacle absent signal indicating absence of an obstacle is input from the obstacle detecting sensor 14 which has been activated by the input of the obstacle detection signal, a door operating signal will be output. The door operating signal from the operation control section 15b will be input to the notification control section 15c and the back door actuation device 16.

The notification control section 15c, once the key authentication information and the key position information have been input from the electronic key authentication/position detection device 12, outputs a notification signal to issue a notification A. Also, when the expression detection signal is input from the gesture recognition section 15a, a notification signal outputs a notification B. When a comparison completion signal recognition signal is input from the gesture recognition section 15a, a notification signal outputs a notification B. When the comparison completion signal recognition signal is input from the gesture recognition section 15a, a notification signal to stop to output the notification B is output. In other words, the notification control section 15c corresponds to an operation determining unit that determines the operation state of at least one of the electronic key recognition/position detection device 12 and the gesture recognition device 13.

In addition, the notification control unit 15c outputs a notification signal for outputting the notification C in response to an input from the gesture recognition section 15a. Further, in response to an input from the operation control section 15b, a notification signal is output to output the notification D. Further, in response to an input of the obstacle presence information indicating that there is an obstacle from the obstacle detecting sensor 14, a notification signal is output to output the notification E. Note that all these notification signals are input to the notification device 17.

The back door actuating device 16 is operable to unlock a lock device (not shown) provided in the back door B and open the door, in response to an input of a door operation signal from the operation control section 15b. Thus, the back door B will be operated to be unlocked and opened. In other words, the back door actuating device 16 corresponds to an operating unit to operate the back door B in accordance with the physical expression recognized by the gesture recognition section 15a.

The notification device 17 is provided in the motor vehicle C and outputs various kinds of notifications (notifications A to E) in response to the notification signals input from the notification control section 15c. In other words, this notification device 17 corresponds to the notification unit for notifying the judgment result of the operating state by notification control section 15c. Here, the notification device 17 is configured by a hazard lamp H, and an exterior buzzer Z provided in the vicinity of the rear combination lamp, (see FIG. 2).

Note that in the notification device 17, in order to output the notification A, the hazard lamp is blinked twice (see FIG. 4A). In addition, in order to output the notification B, the hazard lamp is continued to blink in a color different from the notification (see FIG. 4B). In addition, in order to output the notification C, the short sound of bass from the outside buzzer is generated twice from the exterior buzzer (see FIG. 4C). In addition, in order to output the notification D, the hazard lamp is caused to blink or flash twice and, in synchronization, a short sound of high tone will be generated twice to matching the flashing of the lamp. (see FIG. 4D). In addition, in order to output the notification E, a prolonged sound of bass is generated twice from the exterior buzzer (see FIG. 4E).

[Configuration of Door Operation Control Process]

Figure 5:
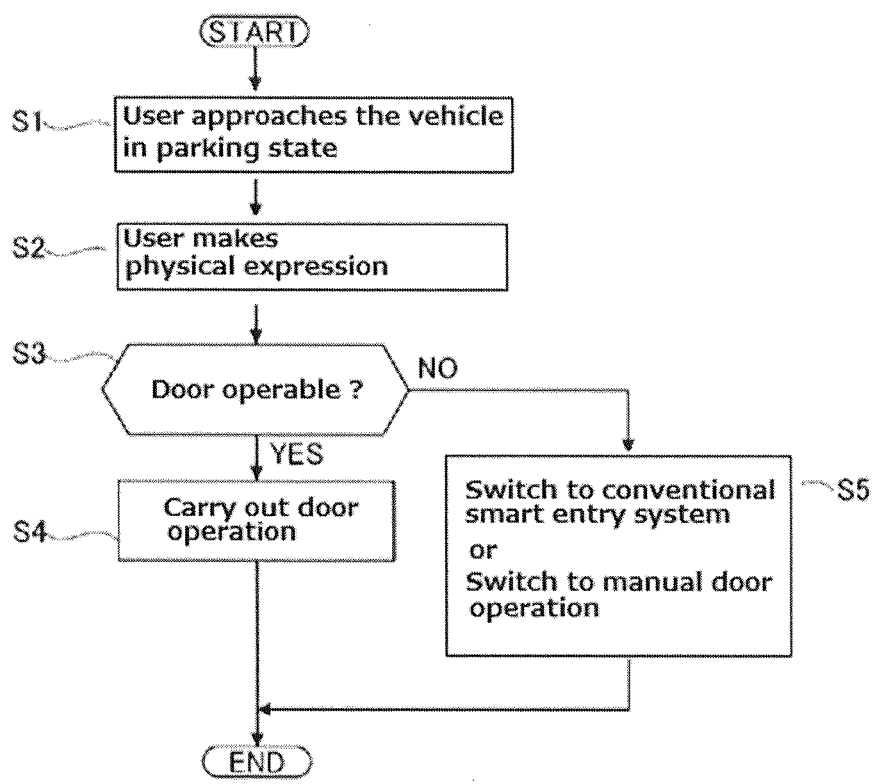
FIG. 5 is a flowchart showing a flow of the door operation control processing executed by the control apparatus for a vehicle opening/closing member in the first embodiment.

FIG. 5 is a flowchart showing a flow of the door operation control process executed by the control apparatus for the vehicle opening/closing member in the first embodiment. In the following, a description is given of each step of the flowchart in FIG. 5, illustrating the door operation control process.

In step S1, it is detected that the user S carrying the electronic key 11 is approaching the motor vehicle C in the parking state, the process proceeds to step S2. In this case, the approach of the user S is detected whether or not the electronic key 11 authenticated has entered the key authentication enabled area X. an be authenticated area X within. When the electronic key 11 enters the key authentication enabled area X, the user S is held to have approached.

In step S2, following the approach of the user S in step S1, the user S makes a physical expression and the process proceeds to step S3.

In step S3, following the execution of the physical expression in step S2, it is determined whether or not the unlock operation and the opening operation of the back door B are possible. If YES (i.e., operation possible), the process proceeds to step S4, whereas if NO (operation impossible), the process proceeds to step S5.

Here, the determination whether or not the door is operable is made based on whether or not all conditions that the electronic key 11 has been authenticated, that the physical expression of the user S has been recognized, and that no obstacle is present in the operating area of the back door B are satisfied. The door is determined to be operable if all these conditions are satisfied, whereas it is determined to be inoperable if one of the conditions is not satisfied.

In step S4, following the determination that the back door B is operable in step S3, the back door actuation device 16 carries out the unlock and opening operations of the back door B and the process proceeds to END.

In step S4, following the determination that the back door B is operable in step S3, the unlocking and opening operations of the back door B are carried out and the process ends.

In step S5, following the determination that the door is inoperable, when the door is inoperable because of the physical expression of the user S being unrecognizable, the process switches the operating system of the back door B to the conventional smart entry system. In addition, in the case of the inoperable state of the door due to an obstacle in presence in the operating area of the back door B, the process switched the operating system of the back door B to a manual operation mode of the door, and the process ends.

Here, the "conventional smart entry system" refers to a system in which the user S carrying an authenticated electronic key 11 performs the door operation by pressing the button provided on the back door B.

[Configuration of the First Stage Notification Process]

Figure 6:
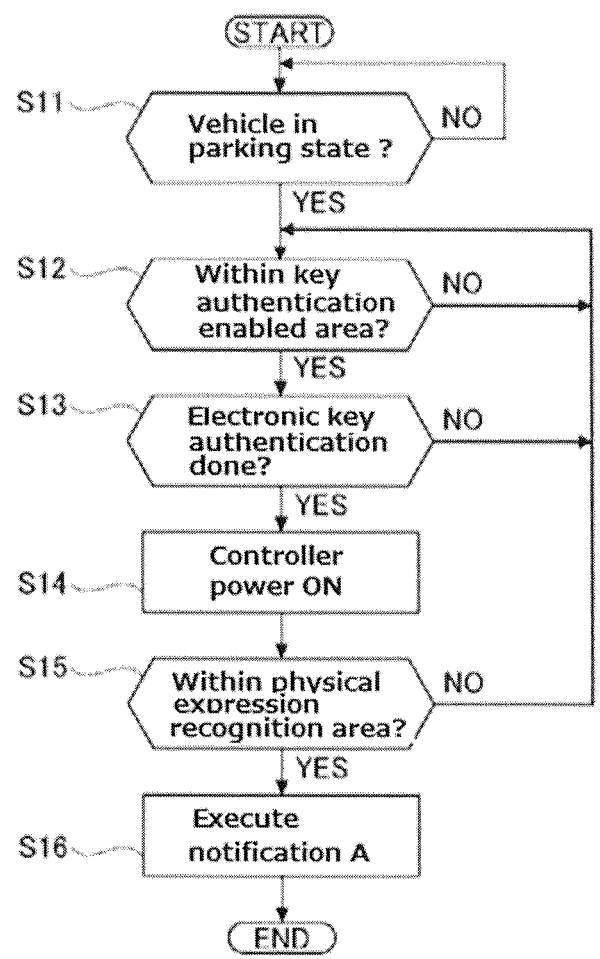
FIG. 6 is a flowchart showing a flow of a first stage notification process executed by the control apparatus for the vehicle opening/closing member in the first embodiment.

FIG. 6 is a flowchart showing a flow of the first stage notification process executed by the control apparatus for the vehicle opening/closing member in the first embodiment. and closing of Example 1. The first step notification process is a notification process executed at the stage of the step S1 in the door operation process shown in FIG. 5. In the following, a description is given of each step of the flow-chart shown in FIG. 6, illustrating the first stage notification process.

In step S11, the vehicle C is determined whether or not in a parking state. If YES (in parking state), the process proceeds to step S12. If NO (non-parking), the process repeats the step S11.

Here, the determination of the parking state is made when the electronic key authentication/position detection device is in a power ON and when the controller 15 is set to the power OFF.

In step S12, following the determination that the vehicle is in a parking state in step S11, it is determined whether or not the electronic key 11 is present within the key authentication enabled area X. If YES (present), the process proceeds to step S13. If No (i.e., not present), process repeats the step S12.

Here, the determination that the electronic key 11 is present in the key authentication enabled area X is made based on the condition that a wireless communication is available between the electronic key authentication/position detection device 12 and the electronic key 11.

In step S13, following the determination that the key is present in the key authentication enabled area X in step S12, it is determined whether or not the authentication of the electronic key 11 is done. If YES (authentication possible), the process proceeds to step S14. If NO (authentication impossible), the process proceeds to step S12.

Here, the determination of the authentication of the electronic key 11 is carried out by wireless communication a plurality of times being established between the electronic key 11 and the electronic key authentication/position detection device 12.

In step S14, following the determination key that authentication is possible in step S13, the controller 15 is set to power ON and the process proceeds to step S15.

In step S15, following the controller's power ON in step S14, it is determined whether or not the electronic key 11 is present within a physical expression recognition area Y. In the case of YES (i.e., present), the process proceeds to step S16, while in the case of NO (i.e. not present), process returns to step S12.

Determination that the electronic key 11 is present in the physical expression recognition area Y is made based on the radio field intensity and the information of directivity obtained in the radio communication that is performed between the electronic key 11 and the electronic key authentication/position detection device 12.

In step S16, following the determination of being within the physical expression recognition area Y in step S15, it is determined that the authentication of the user S whose physical expression should be detected has been completed, and the notification of the notification B is carried out by the notification device 17 to the user S with process proceeding to END.

Here, issue of notification A is carried out by outputting a notification signal for outputting the notification A to the notification device 17 from the notification control section 15c to thereby blink the hazard lamp twice.

[Construction of the Second Stage Notification Process]

Figure 7:
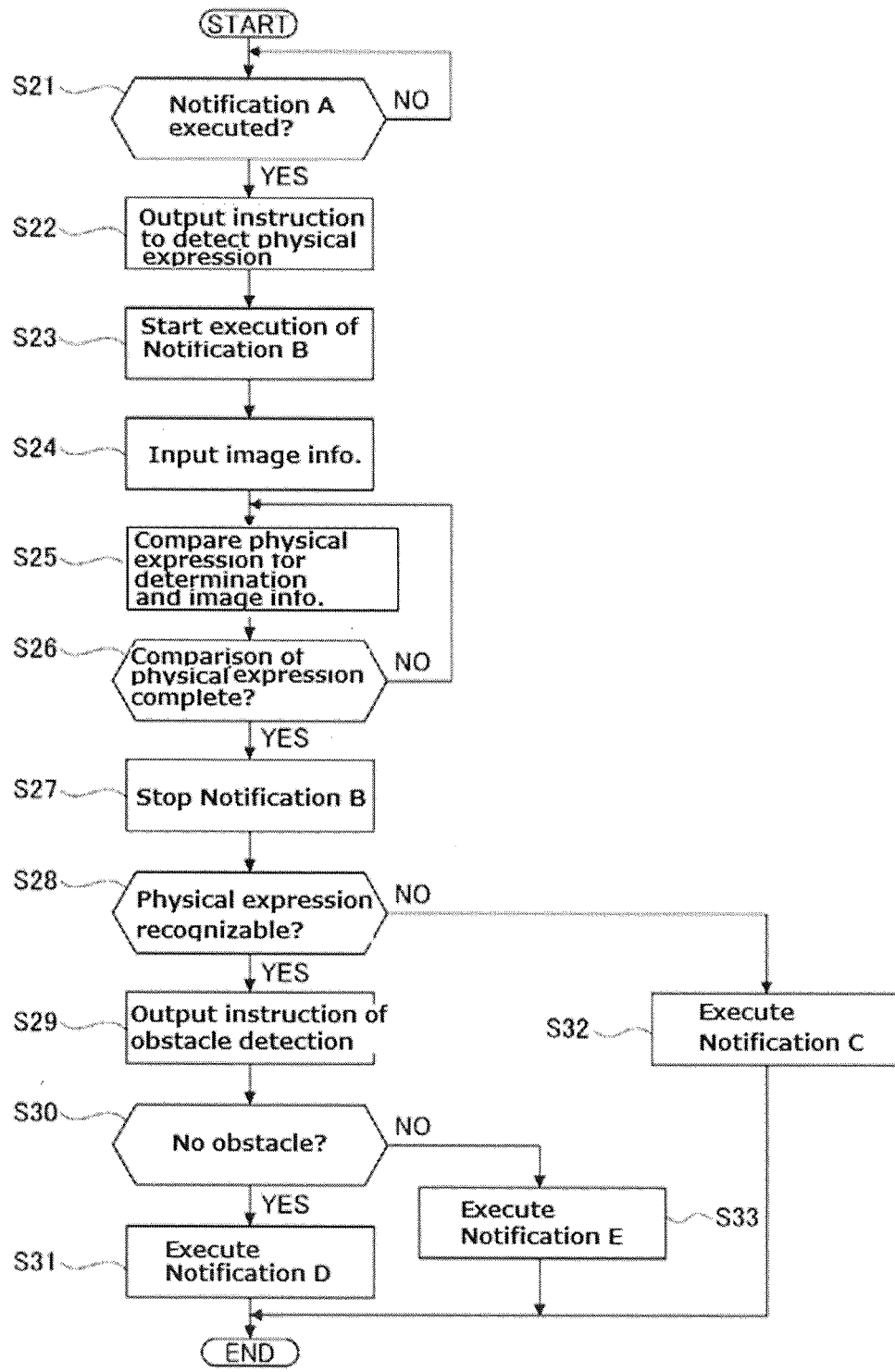
FIG. 7 is a flowchart showing a flow of a second stage notification process executed by the control unit of the vehicle opening/closing member in the first embodiment.

FIG. 7 is a flowchart showing a flow of a second stage notification process executed by the control apparatus for the vehicle opening/closing member in the first embodiment. The second stage notification process is a notification process to be executed between steps S2 and S4 in the door operation process shown in FIG. 5. In the following, a description is given of each step of the flow chart in FIG. 7 showing the second stage notification process.

In step S21, it is determined whether or not the notification A by the notification device 17 has been executed. If YES (notification A executed), the process proceeds to step S22. If NO (notification A unexecuted), process repeats step S21.

In step S22, following the determination that the notice A being executed in step S21, the gesture recognition section 15a outputs an instruction to the gesture sensing device 13 to image capture the user S, i.e. an expression detecting signal to execute the detection of the physical expression by the user S, and the process proceeds to step S23. Thus, by performing the imaging of the user S, the gesture detection device 13 obtains image information.

In step S23, following the output of the image capturing instruction in step S22, the notification device 17 starts execution of the notification B to the user S and the process proceeds to step S24.

Here, execution of notification B is carried out by outputting a notification signal for outputting a notification B to the notification device 17 from the notification control section 15c to thereby causing the hazard lamp to continue to flash in a color different from the notification A.

In step S24, following the execution start of notification B in step S23, the image information obtained by gesture sensing device 13 is input to the gesture recognition section 15a, and the process proceeds to step S25.

In step S25, following the input of image information in step S24, a physical expression for determination of the gesture previously stored (registered) in the gesture recognition section 15a and the input image information are compared to each other, and the process proceeds to step S26.

In step S26, following the execution of the comparison of the physical expression in step S25, it is determined whether or not the comparison between the image data and the physical expression for determination has been completed, i.e., whether or not the comparison result has been output. If YES (comparison completed), the process proceeds to step S27 while NO (comparison unfinished), process goes back to step S25.

In step S27, following the determination of completion of the comparison in step S26, it is determined that detection of physical expression of the user S has been completed, and issue of notification B by the notification device 17 will stop with process proceeding to step S28.

Here, the stop of the notification B is done by outputting a notification signal to stop the notification B to the notification device 17 from notification control section 15c to thereby allow the hazard lamp to stop (extinguish) flashing of the hazard lamp.

In step S28, following stop of notification B in step S27, it is determined whether or not the physical expression of the user S is recognizable. If YES (physical expression being recognizable), the process proceeds to step S29, while if NO (physical expression being unrecognizable), the process proceeds to step S32.

Here, with respect to the determination of recognition of physical expression, in comparison between the image information and the physical expression for determination made in step S25, when the image information matches the physical expression for determination, it is determined to be recognizable, whereas when unmatched, the determination of unlatching is made out.

In step S29, following the determination of the physical expression being recognizable in step S28, the operation control section 15b outputs an obstacle detection signal indicating an obstacle detection to the obstacle detecting sensor 14, and the process proceeds to step S30. Thus, the obstacle detecting sensor 14 performs sensing of the obstacle within the operating area of the back door B and obtains obstacle information.

In step S30, following the output of the obstacle detection instruction in step S29, based on the obstacle information obtained by the obstacle detecting sensor 14, it is determined whether or not an obstacle is present in the operating area of the back door B. If YES (not present), the process proceeds to step S31, while if NO (present), the process proceeds to step S33.

In step S31, following the determination that there is no obstacle in step S30, the operation of the back door B is held to be possible, issue of notification D to the user S is made by the notification device and process ends.

In this case, the execution of the notification D is performed by outputting the notification D from the notification control section 15c to the notification device 17 to allow the hazard lamp to blink twice and to sound the exterior buzzer a shoot beep of high tone in synchronization with the blinking operation of the lamp.

In step S32, following the decision that the gesture expression is unrecognizable in step S28, it is determined that operation of the back door B is impossible due to inability or failure of recognition of the gesture expression of the user S and issue of the notification C is executed to the user S by the notification device 17 with process ending.

Here, execution of notification C is carried out by outputting a notification signal to output the notification C to the notification device 17 from the notification control section 15c to thereby allow the exterior buzzer to generate a short beep of low tone twice.

In step S33, following the determination that an obstacle is present in step S30, it is determined that the back door B is inoperable due to interference with the obstacle if opening operation is performed and the notification E is made to the user S by the notification device 17 with process ending.

Here, execution of the notification E is performed by outputting a notification signal to output the notification E to the notification device 17 from the notification control section 15c to thereby allow the exterior buzzer to generate a long beep of low tone twice.

Now, the operation will be described.

First, a description will be given of a behavior/recognition of a user in a control apparatus for a vehicle opening/closing member in a Comparative Example. Subsequently, a description will be given of a notification operation in the control apparatus for a vehicle opening/closing member in the first embodiment.

[Behavior/Recognition of the User and Door Operating Control in a Control Apparatus for a Vehicle Opening/Closing Member in a Comparative Example]

Figure 8:
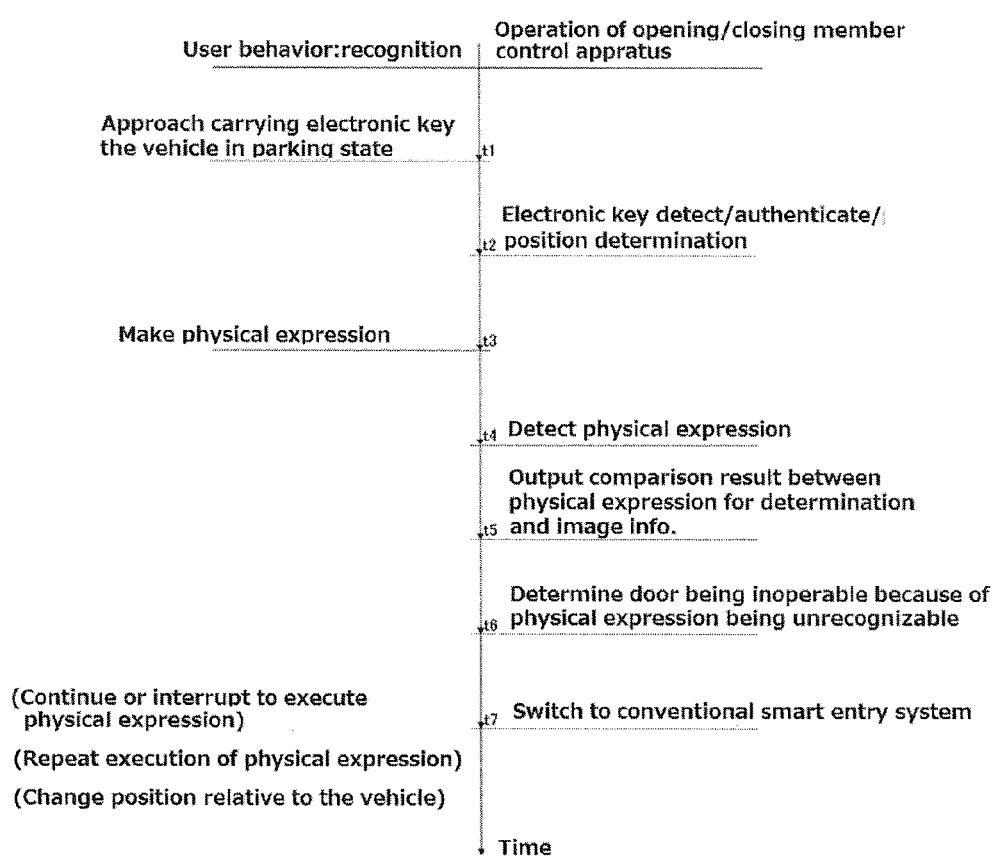
FIG. 8 is an explanatory diagram showing the timings of the behavior/recognition of the user and those of the door operation control when the physical expression has not been recognized in the control apparatus for the vehicle opening/closing member in a Comparative Example.

The vehicle control apparatus opening and closing of Comparative Example, FIG. 8 is a diagram showing the timings of behavior/recognition of the user and door operating control in a vehicle opening/closing member in a Comparative Example when the physical expression is unrecognizable.

According to a control apparatus for a vehicle opening/closing member in the Comparative Example, a physical representation or expression of a user S carrying an electronic key 11 is detected, and notification of door operation readiness is issued when the detected gesture expression is recognized to subsequently perform the door operation or actuation.

Further, in the control apparatus for the vehicle opening/closing member of the Comparative Example, a physical representation or expression of a user S carrying an electronic key 11 is detected, and when the detected physical expression has not been recognized, the door operating system is switched to the conventional smart entry system.

In the following, a description is given of the timings of the behavior/recognition of the user and those of the door operating control when the door operating system is switched to the conventional smart entry system when the physical expression of the user S has been unrecognizable.

At time t1 shown in FIG. 8, the user S carrying the electronic key 11 approaches the motor vehicle in a parking state. At this time, the user approaches while guessing the position since it is impossible to recognize whether or not the electronic key 11 is entering the key authentication enabled area X.

At time t2, the control apparatus for the vehicle opening/closing member in the Comparative Example detects and authenticates the electronic key 11 and determines whether or not the electronic key 11 is within the physical expression recognition area Y.

At time t3, the user S assumes that the electronic key 11 is authenticated and present in the physical expression recognition area Y and makes a physical expression.

At time t4, the control apparatus for a vehicle opening/closing member of the Comparative Example detects the physical expression made by the user S.

At time t5, the control apparatus for a vehicle opening/closing member of the Comparative Example compares the image information or data with the physical expression for determination previously stored (registered), and output the comparison result.

At time t6, the control apparatus for a vehicle opening/closing member of the Comparative Example determines that door is inoperable since the physical expression is unrecognizable due to incorrect physical expression, interruption thereof, etc.

At this time, the user S is incapable of grasping or recognizing whether or not his or her physical expression has been compared or recognized. Therefore, the user may continue to make physical expression or interrupt without success.

At time t7, since it is determined that the door has been inoperable, the control apparatus for the vehicle opening/closing member in Comparative Example switching the door operating system to the conventional smart entry system. of a conventional door operating system. At this time, since the user S is unaware of the situation in which the door operating system has been switched to the conventional smart entry system, he or she will sometime unnecessarily wait for the door operation being performed. In addition, since the state of the door operation readiness is not informed to the user S, he or she is not aware of the reason why the door operation is not completed due to absence of notification on the door operation readiness, so that he or she user may repeat the physical expression or change his or her position relative to the motor vehicle D to end up with possibility of total confusion.

Note that in the control apparatus for the vehicle opening/closing member in Comparative Example shown in FIG. 8, although the detection/authentication of the electronic key 11 is performed, in some cases, the very detection/recognition of the electronic key 11 is not be done in the first place. In these cases as well, since the user S is unaware of the fact that the electronic key 11 was not detected or authenticated, he or she may continue the physical expressions in vain.

Further, even when the electronic key 11 is detected and authenticated, without having the electronic key 11 entered within the physical expression recognition area Y, it is not possible to detect the physical expression. However, even in this case, since the user S does not recognize that the electronic key 11 is not in the physical expression recognition area Y, he or she sometimes makes a physical expression in vain.

[Notification Operation]

Figure 9:
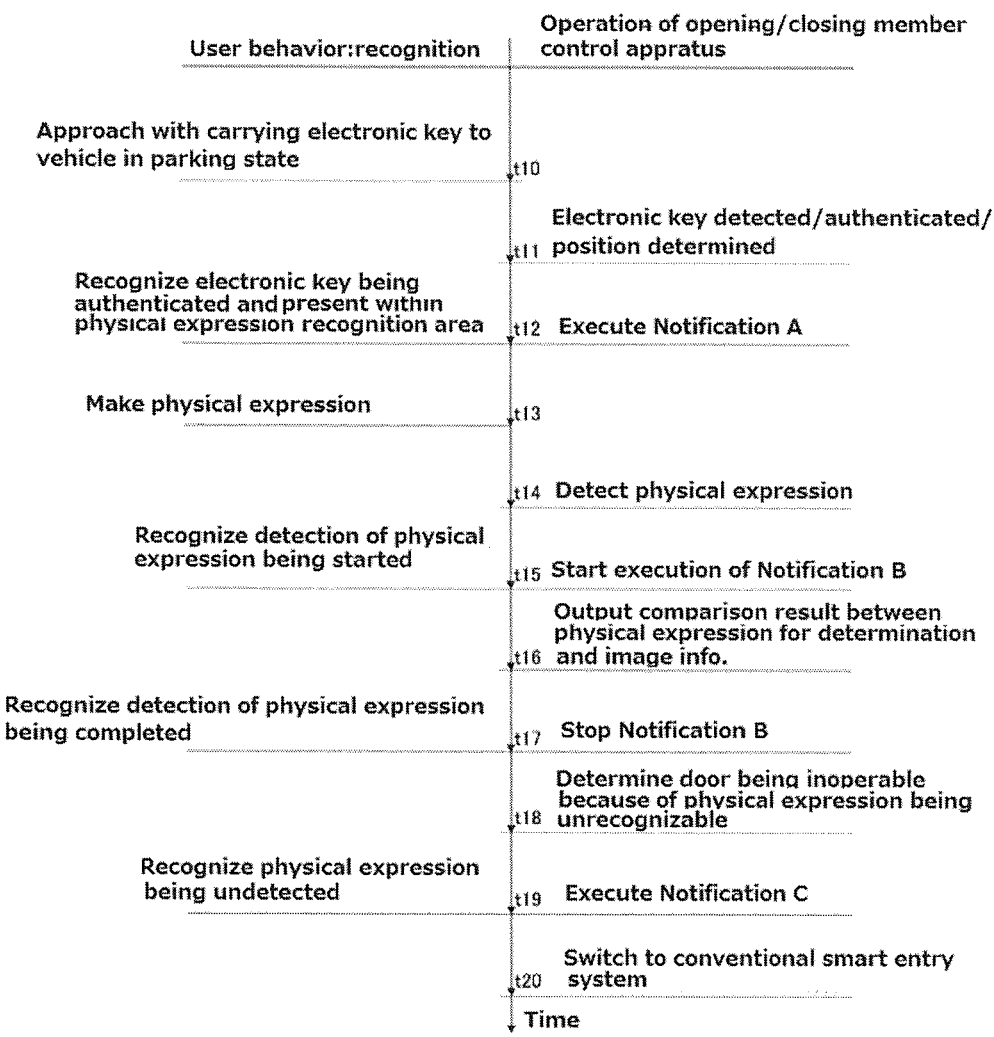
FIG. 9 is an explanatory diagram showing the timings of the behavior/recognition of the user and those of the door operation control when the physical expression has not been recognized in the control apparatus for the vehicle opening/closing member in the first embodiment.

FIG. 9 is a diagram showing the timings of the behavior/recognition of the user and those of the door operating control when the physical expression has not been recognized in the first embodiment of the control apparatus for a vehicle opening/closing member.

In the control apparatus for the vehicle opening/closing member in the first embodiment, when executing the door operating control process, a first stage notification process as well as a second notification process is performed.

In the following, a description is given of the notification operation.

At time t10 shown in FIG. 9, the user S approaches the motor vehicle C in a state carrying the electronic key 11.

At time t11, the control apparatus 10 for the vehicle opening/closing member detects and authenticates the electronic key 11 and determines whether or not the electronic key enters the physical expression recognition area Y.

At time t12, since the control apparatus 10 for the vehicle opening/closing member was able to detect and authenticate the electronic key 11, a notification A in the first stage notification process is carried out. Thus, the user S may recognize that the electronic key 11 is authenticated by the control apparatus 10 of the vehicle opening/closing member, and that the electronic key 11 being carried by him or herself is present within the predetermined area (physical expression recognition area Y).

At time t13, after the user S becomes aware that the physical expression is now recognizable after the electronic key 11 has been authenticated and is present within the predetermined area (the physical expression recognition area Y), he or she makes the physical expression.

At time t14, the control apparatus 10 for the vehicle opening/closing member detects the physical expression being made by the user S.

At time t15, since the control apparatus 10 for the vehicle opening/closing member has detected the physical expression, the control unit 10 begins to execute the notification B in the second stage notification process. Thus, the user S can recognize that the detection of the physical expression is started to be detected, it is possible to eliminate the possibility to interrupt the physical expression inadvertently.

At time t16, the control apparatus 10 for the vehicle opening/closing member compares the image data and the physical expression for determination that is previously stored (registered), and outputs the comparison result.

At time t17, in response to the comparison result being output, the control apparatus 10 for the vehicle opening/closing member stops the notification B. Thus, the user S can recognize that the detection of the physical expression is completed and, therefore, it may be possible to eliminate to continue to perform the physical expression in vain.

At time t18, the control apparatus 10 for the vehicle opening/closing member cannot recognize the physical expression due to incorrect physical expression, etc. and subsequently determines that the door is inoperable.

At time t19, since the control apparatus for the vehicle opening/closing member determined the inoperability of the door, the notification C will be issued. Thus, the user S is able to recognize that the physical expression made was not recognized and the door operation will not be performed. Therefore, it is possible to prevent to put the user in a confused situation in which the physical expression is repeated again and the relative position to the motor vehicle C is changed.

At time t20, since it is determined that the door is inoperable, the control apparatus 10 for the vehicle opening/closing member switches the door operating system to the conventional smart entry system.

At this time, the user S may recognize that the door operation has been switched while being aware of the fact that the door operation will not be done. Thus, the user is prevented from waiting unnecessarily for the door operation being executed.

As described above, in the control apparatus for the vehicle opening/closing member in the first embodiment, prior to recognition of the physical expression, it is determined that the electronic key 11 has been authenticated and detection of the physical expression has been performed. Subsequently, if preformed, the notification A or B is issued accordingly. Therefore, the user S is able to recognize (grasp) the state of the operating process up until the operation or actuation of the opening/closing member in the vehicle opening/closing member control apparatus. Thus, as shown in FIG. 9, even when the back door B is not operated, the user may understand what to do and will be prevented from being puzzled and repeating the physical expressions.

That is, it is possible to perform the operation of the back door B as intended without performing useless operations.

In particular, in the control apparatus 10 for the vehicle opening/closing member, the notification A and the notification B are conducted differently depending on the execution of user authentication and the execution of detection process of the physical expression. Therefore, it is possible to inform the user S at appropriate time of the content (reason) so that the user S may less susceptible to embarrassment or confusion.

In addition, the notification A is issued at the time when the authentication of the electronic key 11 is completed, and the electronic key 11 is present in the physical expression recognition area Y. Therefore, while recognizing that the electronic key 11 has been authenticated reliably and there is no need to move relatively to the motor vehicle C, the user S may perform a physical expression with confidence.

In addition, the notification B will be continued to be issued from detection of the physical expression to the completion of the comparison of the physical expression, i.e., between the start and completion of the physical expression detection process. Therefore, the user S is able to recognize without fail that his or her physical representation or expression is being recognized reliably so that he or she can make an accurate physical expression without being interrupted inadvertently or continuing unnecessarily.

Now, a description is given of technical effects. In the control apparatus for the vehicle opening/closing member in the first embodiment, it is possible to obtain the following effects.

(1) In a control apparatus 10 for a vehicle opening/closing member that operates the opening/closing member (back door) B provided in the vehicle (motor vehicle) C, it is configured by providing
a user authentication unit (electronic key authentication/position detection device) 12 that authenticates a user S who makes a physical expression to be detected;
a physical expression detecting unit (gesture detection device) 13 that detects the physical expression of the user S;
an operation determining unit (notification control section) 15c that determines an operating state of at least one of the user authentication unit 12 and the physical expression detecting unit 13; and a notification unit (notification device) 17 that notifies a determination result of the operating state determined by the operation determining unit/section 15c.

Thus, the user S can recognize (grasp) the operating process in the control apparatus 10 for the vehicle opening/closing member until the back door B will be operated or actuated. Therefore, even in the case in which the back door B is not operated, the user S may understand what should be done and is prevented from being puzzled.

(2) When the operation determining unit (notification control section) 15c determines the start and completion of the physical expression detecting unit (gesture sensing device) 13, the notification unit (notification device) 17 is configured to notify during the operating start determination and the operating completion determination of the physical expression detecting unit (gesture sensing device).

Thus, the user S may recognize that the physical expression of his or herself is being detected reliably so that the physical expression may be made accurately without inadvertent interruption or repeating in vain.

(3) The user authentication unit is provided with a portable device authentication unit (electronic key authentication/position detection device) 12 that authenticates a portable device (electronic key) carried by the user S, and a portable device position detection unit (electronic key authentication/position detection device) 12 that detects the position of the portable device, wherein the operation determining unit (notification control section) 15c is configured to determine the completion of the operation of the user authentication unit when the position of the portable device 11 detected by the portable device position detecting unit 12 is in a predetermined area (physical expression recognition area Y) and the authentication operation of the portable device 11 by the portable device authentication unit 12 is completed. Thus, while being aware that the electronic key 11 has been authenticated reliably and grasping no need to move relative to the vehicle, the user S may make the physical expression with confidence.

Second Embodiment

The second embodiment shows an example in which, after issue of the notification A has been made, another notification is made indicating that the position of the electronic key 11 is out of a predetermined area (physical expression recognition area Y).

Figure 10:
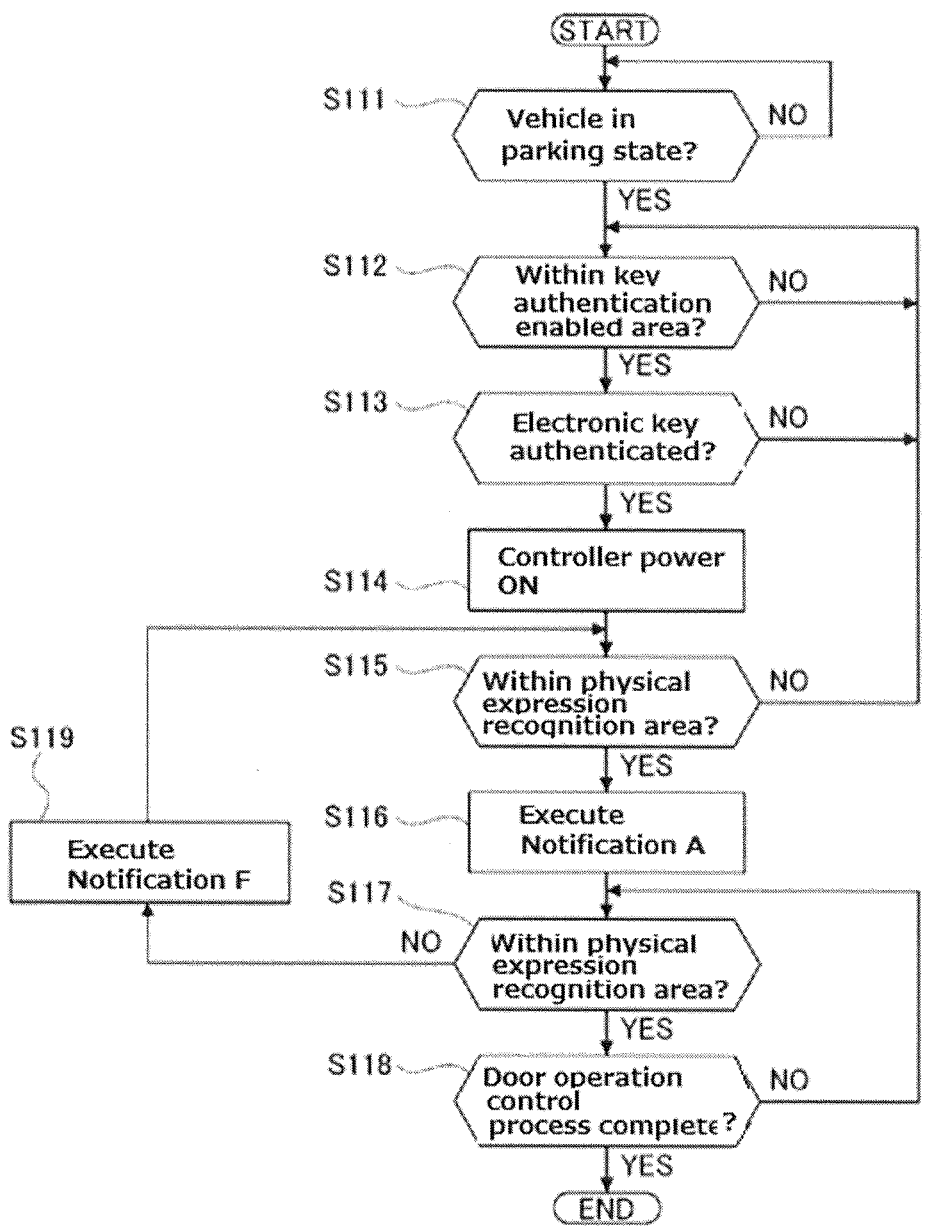
FIG. 10 is a flowchart showing a flow of a first stage notification process executed by the control apparatus for the vehicle opening/closing member in the second embodiment.

FIG. 10 is a flowchart showing a flow of the first stage notification process executed by the control apparatus for a vehicle opening/closing member in the second embodiment. Note that the other configurations and the second stage notification control process are the same as in the first embodiment, description thereof is omitted.

In step S111, it is determined whether or not the vehicle C is in a parking state. If YES (parking state), process transitions to step S112. If NO (non-parking state), process repeats step S111.

In step S112, following the determination of the state of parking in step S111, it is determined whether or not the electronic key 11 is present within a key authentication enabled area X. If YES (present), the process proceeds to step S113. If NO (not present), process repeats step S112.

In step S113, following the determination that the key is located within the key authentication enabled area X, it is determined whether or not the electronic key 11 has been authenticated. If YES (authentication possible), the process proceeds to step S114. If NO (authentication impossible), process returns to step S112.

In step S114, following the determination that key authentication is possible in step S113, the controller 15 is set to power ON, and the process proceeds to step S115.

In step S115, following the power ON of the controller in step S114, it is determined whether the electronic key 11 is present within the physical expression recognition area Y. If YES (present), the process proceeds to step S116. If NO (not present), process returns to step S112.

In step S116, following the determination of being within the physical expression recognition area Y in step S115, it is determined that the authentication of the user S has been completed, and notification of the notification A is made to the user S by the notification device 17, and the process proceeds to step S117.

Here, execution of the notification A is carried out by outputting a notification signal for outputting the notification A to the notification device 17 from the notification control section 15c to allow the hazard lamp to blink twice.

In step S117, subsequent to the execution of the notification A in step S116, it is determined whether or not the electronic key 11 is in presence within the physical expression recognition area Y within. If YES (present), the process proceeds to step S118. If NO (not present), the process proceeds to step S119.

Here, the determination that the electronic key 11 is present within the physical expression recognition area Y is made based on the radio field intensity and directivity obtained in response to the renewed wireless communication between the electronic key 11 and the electronic key authentication/position detection device 12.

In step S118, subsequent to the determination of being within the physical expression recognition area Y in Step S117, it is determined whether or not the door operation control process shown in FIG. 5 is completed. If determined YES (door operation completed), process ends. If NO (door operation not finished), process returns to step S117.

In step S119, subsequent to the determination of being outside of the physical expression recognition area Y in step S117, it is determined that the electronic key 11 deviates from the physical expression recognition area Y and the physical expression is undetectable by the gesture sensing device 13. Then, after notification of the notification F is executed to the user S by the notification device 17, process returns to step S115.

Here, the "notification F" is intended to be a notification to notify the user S that, after authentication of the electronic key 11 is performed by the electronic key authentication/position detection device 12, the electronic key 11 is positioned outside of the physical expression recognition area Y. When executing this notice F, a notification signal for outputting the notification F to the notification device 17 from the notification control section 15c will be output. Note that, in addition, in order to output the notification F, for example, the short sound of bass may be generated three times from the exterior buzzer.

Thus, when the notification F is executed before the door operation control process is completed, the user S is able to recognize that the position of the electronic key 11 is put outside of a predetermined range from the predetermined area (physical expression recognition area Y). Thus, the user S is possible to accurately grasp what to do so that the position of the electronic key 11, i.e., that of him or herself may be changed quickly to enter the predetermined area (physical expression recognition area Y). Also, it is possible to prevent from doing wasteful behavior, such as repeated physical expressions outside the physical expression recognition area Y outside.

In the control apparatus for a vehicle opening/closing member in the second embodiment, it is possible to obtain the following effects.

(4) After the operation determining unit (notification control section) 15c determines the operating state of the user authentication unit (electronic key authentication/position detection device 12 and the notification unit (notification device) 17 notifies the determination result of the operating state from the operating state determining section 15c, when the position of the portable device (electronic key) 11 detected by the portable device position detection unit (electronic key authentication/position detection device) 12 is strayed out the predetermined area (physical expression recognition area Y) said predetermined area, the notification unit 17 is configured to notify that the position of the portable device 11 is out of the predetermined area (physical expression recognition area Y).

Thus, it is possible for the user S to recognize that the position of the electronic key 11 is outside the predetermined area (physical expression recognition area Y). Thus, by moving rapidly to the proper position, the user S is prevented from actions such as unnecessary repeated physical expression outside the physical expression recognition area Y.

Third Embodiment

A third embodiment is an example for notifying that the detection process of the physical expression or representation during the detection process is interrupted.

Figure 11:
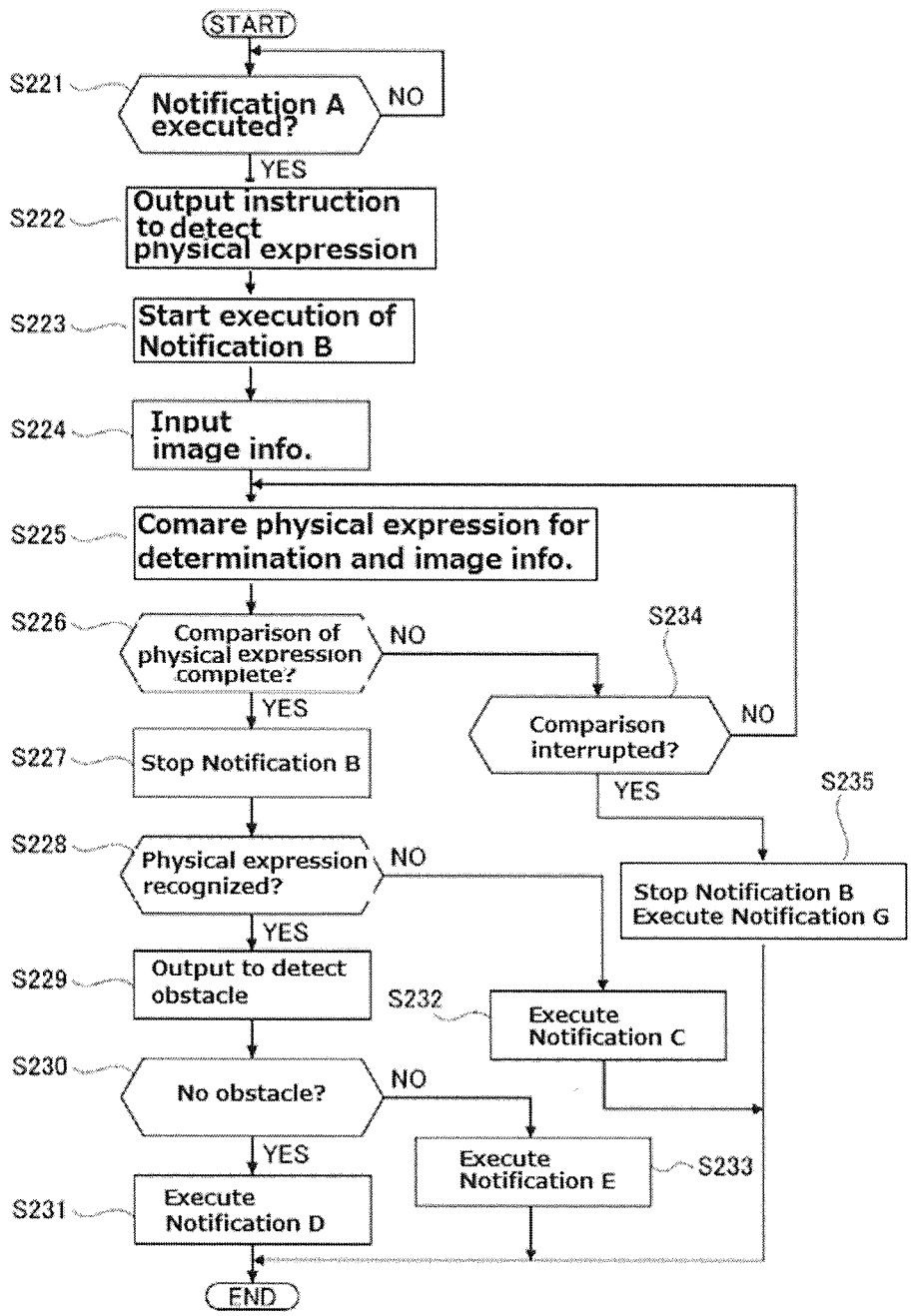
FIG. 11 is a flowchart showing a flow of a second stage notification process executed by the control unit of the vehicle opening/closing member in the third embodiment.

FIG. 11 is a flowchart showing a flow of the second stage notification process executed by the control apparatus for a vehicle opening/closing member in the third embodiment. Below, a description is given of the second state notification control process in the vehicle opening/closing member in the third embodiment. Note that, since the other configurations and the first stage notification control process are the same as the first embodiment, the description thereof will be omitted.

In step S221, it is determined whether or not the execution of the notice A by the notification device 17 is done. If YES (notification done), the process proceeds to step S222. If NO (notification A not executed), process repeats step S221.

In step S222, following the determination that the notification A is executed in step S221, an instruction to image capture the user S from the gesture recognition section 15a to the gesture sensing device 13, i.e. a physical expression detection signal to execute the physical expression by the user S is output, and subsequently the process proceeds to step S223.

Thus, gesture sensing device 13 performs imaging of the user S to obtain image information.

In step S223, following the output of the image capturing instructions in step S222, the notification device 17 starts to execute to issue the notification B to the user S, and the process proceeds to step S224.

Here, execution of the notification B is carried out by outputting a notification signal for outputting the notification B to the notification device 17 from the notification control section 15c while allowing the hazard lamp to continues to flash in a color different from the notification A.

In step S224, following the start of execution of the notification B in step S223, the image information obtained by the gesture sensing device 13 is input to the gesture recognition section 15a, and the process proceeds to step S225.

In step S225, following the input of image information at step S224, the physical expression for determination previously stored (registered) in the gesture recognition section 15a and the image information input are compared to each other, and the process proceeds to step S226.

In step S226, subsequent to the execution of the comparison of the physical expression in step S225, it is determined whether or not comparison between the image information and the physical expression for determination is completed, that is whether or not the comparison result is output. If YES (comparison complete), the process proceeds to S227. If NO (comparison not yet complete), the process proceeds to step S234.

Since each step of steps S233 through S227 is similar in content to each step from steps S27 to S33 shown in FIG. 7, the description thereof is omitted here.

In step S234, subsequent to the determination of the comparison being not finished in step S226, it is determined whether or not the comparison of the physical expression has been interrupted. If YES (comparison interrupted), the process proceeds to step S235. If NO (comparison continued), process reverts to step S225.

Here, "Comparison of physical expression is interrupted" is intended to indicate situations such as when the position of the electronic key 11 is put outside of the physical expression recognition area Y or when, due to failure of the gesture sensing device 13, capturing of the user S is unable to be continued.

In step S235, subsequent to the determination of the comparison being interrupted in step S234, since the physical expression comparison is not done, it is determined to be unnecessary to continue to execute physical expression by the user S, the execution of the notification B by the notification device 17 will be stopped and notification of the notification C to the user S will be executed and process ends.

Here, the "notification G" is intended to notify the user S of the interruption of the detection process during a period from start of the detection of the physical expression by the gesture sensing device 13 to the time of completion of the physical expression detection.

The execution of this notification G is performed by outputting a notification signal for outputting the notification C from the notification control section to the notification device.

In addition, in order to output the notification G, for example, the exterior buzzer is caused to generate short sound of bass and treble twice alternatively.

Thus, when the notification G is executed while the notification B is being performed, the user S is able to recognize that the process of detecting the physical expression is interrupted. Thus, the user S is able to accurately grasp what to do and may interrupt own physical expression being done and prevent from continuing the physical expression in vain.

Further, the user may recognize that the back door B is inoperable by the physical expression so that the user's confusion may be avoided despite the inoperability of the back door B.

In the control apparatus for a vehicle opening/closing member in the third embodiment, it is possible to obtain the following effects.

(5) When the operation determining unit (notification control section) 15c detects, after the start of operation of at least one of the user recognition unit (electronic key authentication/position detection device) 12 and the physical expression detecting unit (gesture sensing device) 13, interruption of the operation thereof.

The notification unit (notification device) 17 is configured to notify the operation interruption determination by the operation determining unit (notification control section) 15c.

Thus, the user S is able to recognize that the process of detecting the physical expression is interrupted and thus prevented from continuing the physical expression uselessly and eliminated from being confused despite non-actuation or the inoperable state of the back door B.

Fourth Embodiment

A fourth embodiment is an example in which a notification to the user B is given at the timing when the detection process of physical expression is complete.

Figure 12:
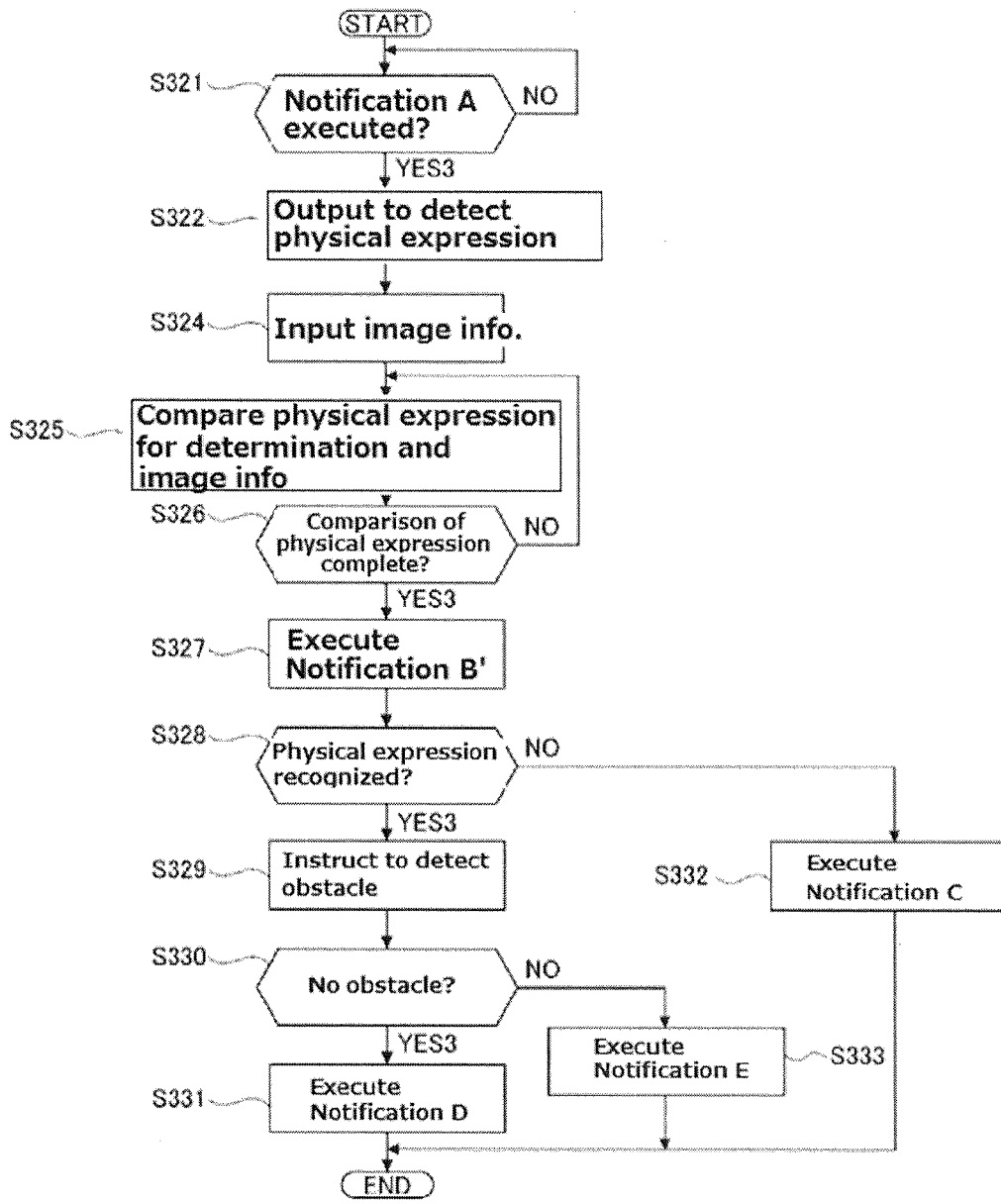
FIG. 12 is a flowchart showing a flow of a second stage notification process executed by the control unit of the vehicle opening/closing member in the fourth embodiment.

FIG. 12 is a flowchart showing a flow of the second stage notification process executed by the control apparatus of the vehicle opening/closing member in the fourth embodiment. Below, a description is given of a second stage notification control process in the control apparatus for a vehicle opening/closing member in the fourth embodiment. Since the other configuration and the first notification control process are similar to those in the first embodiment, the description thereof is omitted.

In step S321, it is determined whether or not the execution of the notification A by the notification device 17 has been done. If YES (notification A executed), the process proceeds to step S322. If NO (notification A unexecuted), process reiterates step S321.

In step S322, following the determination that the notification A is executed in step S321, an instruction from the gesture recognition section 15a to the gesture detection device 13 to image capture the user S, i.e. a physical expression detection signal to execute the detection of the physical expression of the user S is output, and the process proceeds to step S324.

Thus, the gesture sensing device 13 performs imaging of the user S to obtain image information.

In step S324, subsequent to the output of the imaging instruction in step S322, the image information obtained by the gesture sensing device 13 will be input to the gesture recognition section 15a, and the process proceeds to step S325.

In step S325, following the input of image information at step S324, the physical expression for determination previously stored (registered) in the gesture recognition section 15a and the image information input are compared to each other, and the process proceeds to step S326.

In step S326, subsequent to the execution of the comparison of the physical expression in step S325, it is determined whether or not the comparison between the image information and the physical expression for determination is complete, i.e., whether or not a comparison result has been output.

In step S327, subsequent to the determination of the comparison completion in step S326, it is determined that the detection of the physical expression of the user S is complete. Then, notification of the notification B' is executed to the user S by the notification device 17, and the process proceeds to step S328.

Here, the execution of the notification B is performed by outputting a notification signal from the notification control section 15c to the notification device 17 to thereby allow the hazard lamp to blink three times in a color different from the notification A.

Each step from step S333 to step S328 is similar in content to step 28 to step S33 shown in FIG. 7. The description thereof is thus omitted here.

As described above, since the notification is made to the user S at the timing in which the comparison between the physical expression for determination or reference and the physical expression done by the user S is complete, the user is in a position to be aware of completion of the physical expression detection. Thus, assuming that the operation of the back door B is not performed, since the user S is aware that the physical expression detection is complete, it is possible to be put in a confused situation.

In the control apparatus for a vehicle opening and closing member of the fourth embodiment, it is possible to obtain the following effects.

(6) When the operation determining unit (notification control section) 15c determines the operation completion of at least one of the user authentication unit (electronic key authentication/position detection device) 12 and the physical expression detecting unit (gesture sensing device) 13, the notification unit (notification device) 17 is configured to notify of the operation completion determined by the operation determining unit 15c. Thus, the user S is able to recognize the completion of the detection process of the physical expression. Therefore, even when the operation of the back door B is not performed, it is possible for the user S to be prevented from being confounded and the annoyance accompanied by the notification may be reduced.

Fifth Embodiment

The fifth embodiment shows an example in which a notification to the user S is given in each of the timings of the detection process start and completion.

Figure 13:
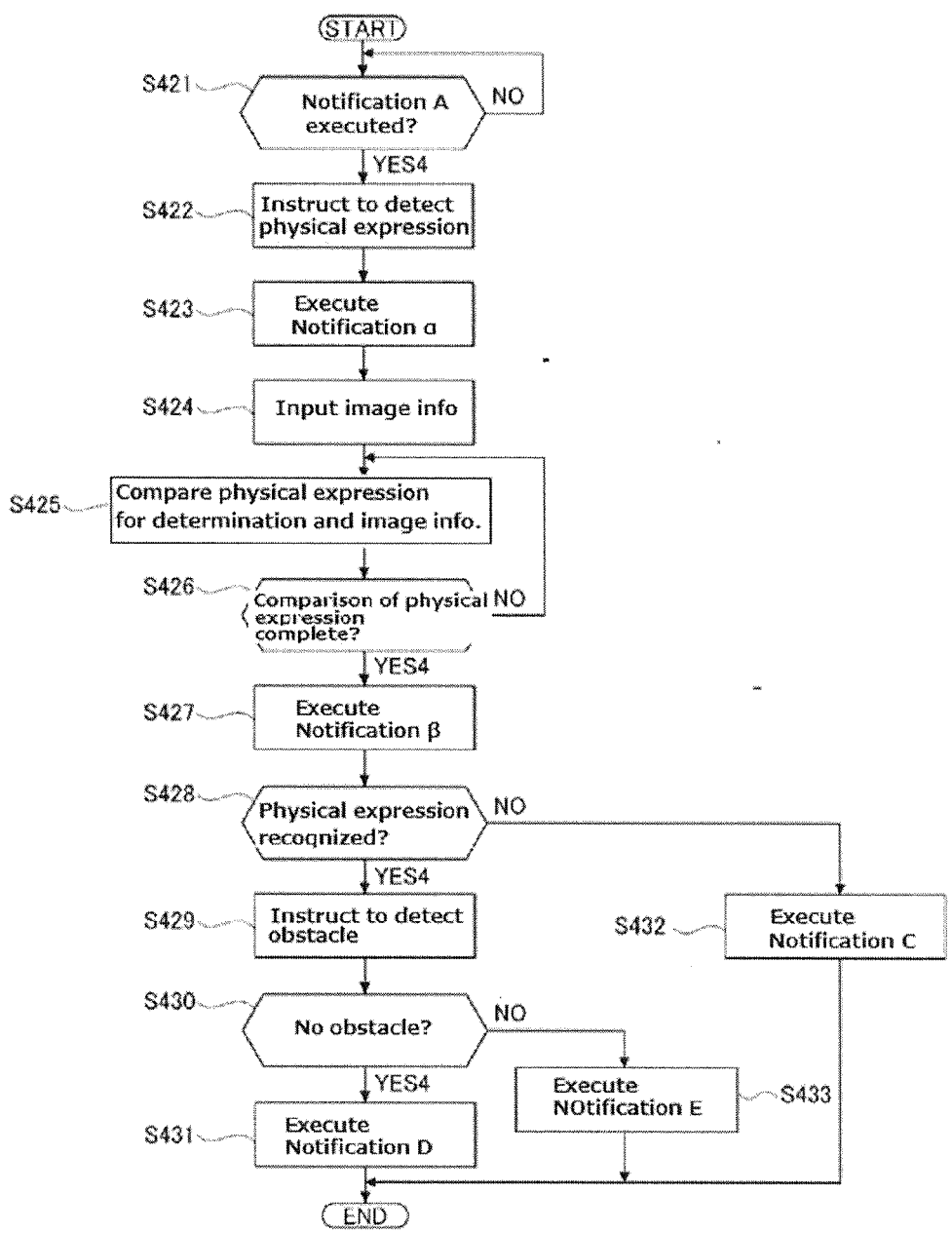
FIG. 13 is a flowchart showing a flow of a second stage notification process executed by the control unit of the vehicle opening/closing member in the fifth embodiment.

FIG. 13 is a flowchart showing a flow of the second stage notification process executed by the control apparatus of the vehicle opening/closing member in the fifth embodiment. Below, a description is given of a second notification control process in the control apparatus for the vehicle opening/closing member.

Since the other configuration and the first notification control process are similar to those in the first embodiment, the description thereof is omitted.

In step S421, it is determined whether or not the execution of the notification A by the notification device 17 is done. If YES (notification A executed), the process proceeds to step S422. If NO (notification A not executed), process repeats step S421.

In step S422, following the determination of execution of the notification A in step S421, an instruction to image capture the user S from the gesture recognition section 15a to the gesture sensing device 13 is given, that is, an expression detection signal to execute to detect the physical expression of the user S is output, and the process proceeds to step S423.

Thus, the gesture sensing device 13 performs imaging of the user S to obtain image information.

In step S423, following the output of the image capturing instructions in step S422, the notification a to the user by the notification device 17 is executed, and the process proceeds to step S424.

Here, execution of notification a is carried out by outputting a notification signal for outputting the notification a to the notification device 17 from the notification control section 15c to thereby allow the hazard lamp to blink twice in a color different from the notification A.

In step S424, subsequent to the execution of the notification a in step S423, the image information obtained by the gesture sensing device 13 is input to the gesture recognition section 15a, and the process proceeds to step S425.

In step S425, following the input of image information at step S424, the physical expression for determination previously stored (registered) in the gesture recognition section 15a and the image information input are compared to each other, and the process proceeds to step S426.

In step S426, subsequent to the execution of the comparison of the physical expression in step S425, it is determined whether the comparison between the physical expression for determination and the image information is completed, i.e., whether or not a comparison result has been output. If YES (comparison complete), the process proceeds to step S427. If NO (comparison incomplete), the process reverts to step S425.

In step S427, subsequent to the determination of comparison completion in step S426, it is determined that detection of physical expression of the user S has been completed, and the notification device 17 notifies the user S of announcement of the notification β, and the process proceeds to step S248.

Here, execution of notification β is carried out by outputting a notification signal for outputting the notification β to the notification device 17 from the notification control section 15c and allowing the hazard lamp to blink three times in a color different from the notification A.

Each step from step S433 through step S428 is similar in content to that in steps S28 through S33 shown in FIG. 7. Therefore, the description thereof is omitted.

As described above, in the timing in which the detection of the physical expression by the gesture sensing device 13 is started as well as in the timing in which the comparison between the physical expression made by the user S and the physical expression for determination is completed and thus the physical expression detection is complete, notifications (notification α, notification β) are announced to the user S, respectively. Thus, the user S is able to recognize respectively the initiation and completion of the detection process of physical expression. Therefore, even when the operation of the back door B is not performed, since the user S is made aware that the physical expression of his or herself has been acceptable, he or she can be prevented from being confused. Further, the notification a and the notification β are performed individually or separately, it is possible to reduce the annoyance due to these notifications.

A control apparatus for a vehicle opening and closing member in the fifth embodiment may possibly obtain the following.

(7) When the operation determining unit (notification control section) 15c determines the operation start of at least one of the user authentication unit (electronic key authentication/position detection device) 12 and the physical expression detecting unit (gesture sensing device) 13, the notification unit (notification device) 17 is configured to notify of the operation start determined by the operation determining unit 15c. Thus, the user S is able to grasp that his or her physical expression is acceptable. Therefore, even when the operation of the back door B is not performed, it is possible for the user S to be prevented from being confused.

Sixth Embodiment

The sixth embodiment shows an example in which a notification is continued between the time of authentication start of the electronic key 11 and determination that the electronic key 11 is positioned in the physical expression recognition area Y.

Figure 14:
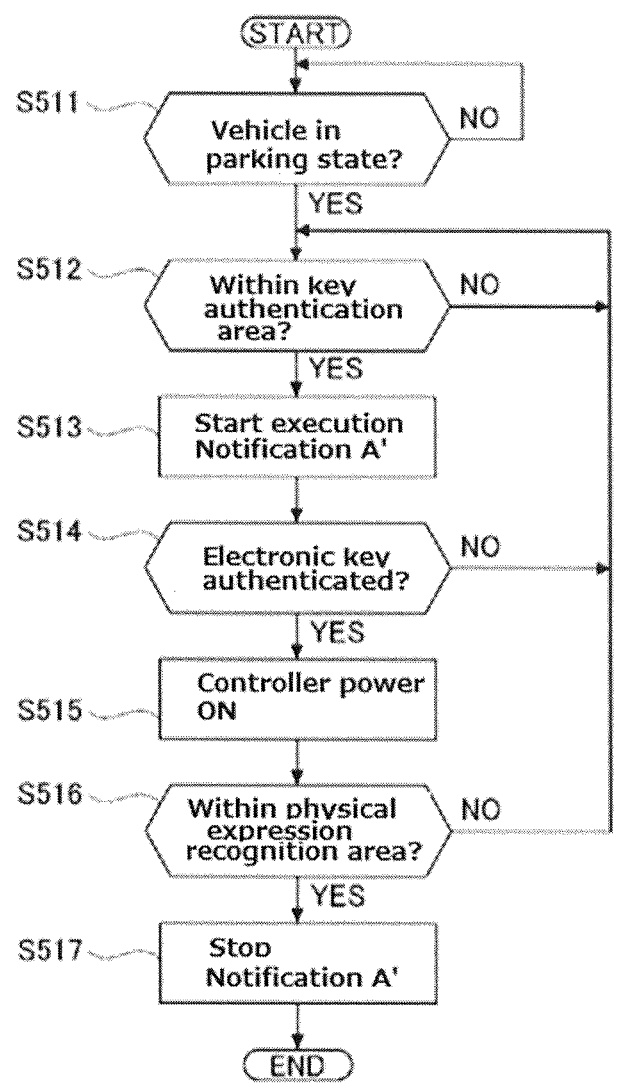
FIG. 14 is a flowchart showing a flow of a first stage notification process executed by the control unit of the vehicle opening/closing member in the sixth embodiment.

FIG. 14 is a flowchart showing a flow of the first stage notification process executed by the control apparatus for a vehicle opening and closing member in the sixth embodiment. In the following, a description is given of the first stage notification process in the control apparatus for vehicle opening/closing member in the sixth embodiment. Since the other structure and the second notification control process are similar to those in the first embodiment, the description thereof is omitted.

In step S511, it is determined whether or not the motor vehicle C is determined is in a parking state. If YES (in parking state), the process proceeds to step S512. If NO (non-parking), process repeats step S511.

In step S512, subsequent to the determination of the parking state in step S511, it is determined whether or not the electronic key 11 is present in a key authentication enabled area X. If YES (present), the process proceeds to step S513. If NO (not present), process repeats step S512.

In step S513, following the determination of the key being present in the key authentication enabled area in step S512, the notification device 17 starts to execute notification of the notification A' to the user S, and the process proceeds to step S514.

Here, the execution of the notification A' will be done by outputting a notification signal that causes the notification device 17 to output the notification A' from the notification control section 15c and allowing the hazard lamp to continue blinking in the same color as in the notification A in the first embodiment.

In step S514, following the start of execution of the notification A' at step S513, it is determined whether or not the authentication of the electronic key 11 is made. If YES (authentication possible), the process proceeds to step S515. If NO (authentication impossible), process returns to step S512.

In step S515, following the determination of the key authentication being made in step S514, the controller 15 is set to power ON, and the process proceeds to step S516.

In step S516, following the power ON of the controller in step S515, it is determined whether or not the electronic key 11 is present within the physical expression recognition area Y. If YES (present), the process proceeds to step S517. If NO, process returns to step S512.

In step S517, following the determination of being within the physical expression recognition area Y in step S516, it is determined that the authentication of the user S has been completed and announcement of the notification A' by the notification device 17 is stopped while the process proceeds to end. Notification of the notification A to the user S is executed, and the process proceeds to step S117.

Here, stopping of the notification A' is performed by outputting a notification signal to stop the notification A' from the notification control section 15c to the notification device 17 to thereby allow the hazard lamp to stop blinking (extinguished and off).

As described above, the notification A' is continued to be issued during a period between the authentication start of the electronic key 11 by the electronic key authentication/position detection device 12 and the recognition of the electronic key 11 within the physical expression recognition are, that is from the start to completion of the recognition process by the user S. Therefore, the user S is continuously aware of the appropriateness of the self-position, and, without moving out of the physical expression recognition area Y accidentally, he or she may make a physical expression in an appropriate state.

In the control apparatus for a vehicle opening and closing member in the sixth embodiment, it is possible to obtain the following effects.

(8) The operation determining unit (notification control section) 15c determines the operation start and completion of the user authentication unit (electronic key authentication/position detection device) 12, and, during a period of the operation start determination and the operation completion determination, the notification is configured to be continued. Thus, the user S is able to continuously aware whether or not his or her own position is appropriate so that, without moving outside of the physical expression recognition area Y accidentally, he or she may make a physical expression in an appropriate condition.

The control apparatus for a vehicle opening/closing member has been described based on the first to sixth embodiments. However, the specific configuration is not restricted to these embodiments. Rather, with respect to specific configurations, a design change, addition, and the like may be allowed, within the scope of the claims.

In each of the embodiments described above, an example is shown to perform the notification A after completing the authentication of the user S, and to perform the notification B after completion of the detection of the physical representation. However, it may be configured so that any one of these notifications is made.

Even in that case, it is possible to grasp the state of the operating process up until the time in which the back door B will be operated.

Further, in each of the above embodiments, such an example is shown in which, after the authentication of the electronic key 11 is performed, when the electronic key 11 is located within the physical expression recognition area Y, the notification A is made.

However, without being limited to this configuration, it is also possible to perform the notification of the notification A in a stage in which the electronic key 11 has been recognized, without being limited in step A is not limited to this.

Even in this case, the user can recognize (grasp) the state of one of the operating process until the operation of the opening/closing member for a vehicle opening/closing control apparatus. Thus, even when the back door B is not performed, it is possible to be confounding.

Further, in each of the above embodiments, an example is shown in which, after the authentication of the electronic key 11 is performed, when electronic key 11 is positioned within the physical expression recognition area Y, completion of the authentication of the user S is determined to execute the notification A.

However, without being limited thereto, when a part of the body of the user S is recognized (detected) as a feature point necessary for detection of the physical expression, it may be determined that the authentication of the user S is executed by the electronic key authentication/position detection device 12.

In addition, it may be configured in such a way that, when the electronic key 11 is authenticated, the notification A is given, and, when the authenticated electronic key 11 is present within the physical expression recognition area Y, a notification Aα different from A is executed. In addition, when the part of the body of the user S is recognized (detected) as the feature point required for detection of the physical expression, a notification Aβ different from both the notification Aα and A may be issued. In other words, the notification by the notification device 17 may be varied in accordance with the progress of operation in electronic key authentication/position detection device 12.

In each of the above embodiments, as the opening/closing member, an example of back door B provided in the rear of the vehicle C is presented. However, without being limited to this, the opening/closing member may be a front driver's door, passenger door, a rear side door or may be a movable roof for covering the front hood (bonnet hood) or passenger compartment. Further, it is possible to appropriately change the opening/closing member as the operation object in response to the physical representation of the user S.

In each of the above embodiments, as the operations of the opening/closing member, an example of the opening operation and the unlocking operation of the back door B is provided. However the operation may be a locking operation. Also, the operation is intended to be unlocking operation only or opening operation only.

Further, in the above embodiments, an example is shown in which the notification device 17 is implemented by a hazard lamp and an exterior buzzer and various notifications (notifications A to E) are produced by controlling the hazard lamp and the exterior buzzer in different ways. However, a lamp specifically dedicated for notification may be mounted on the vehicle body and notifications are given by flashing the notification dedicated lamp in different blinking patterns and colors depending on the various types of notifications.

Further, by providing a rotating lamp to the vehicle body, the rotating lamp is driven in different colors and patterns depending on various kinds of notifications.

Furthermore, notice the rotating lamp. Furthermore, by mounting a device such as a liquid crystal panel that can display a figure or a character to the surface of a rear window or a bumper surface, the content corresponding to the notification of various kinds may be displayed for notification.

Further, the notification device 17 may be configured to simultaneously turn on lamps (direction indicators) disposed at both ends in the vehicle width direction, for example. Also, the notification device 17 may be a lamp for irradiating a predetermined area of the physical expression recognition area Y, or the like. It is thereby possible to recognize visually the physical expression recognition area Y by the notification device 17 to thereby reducing the user confusion.

Further, in the above embodiments, as the example of the physical representation or expression, an action of the right hand or arm of the user S to move up and down greatly is shown. However, without being limited thereto, the right hand of a user S, but is not limited thereto. The physical expression can be any intention including gestures, eye movements, voice, facial expressions, etc., using the body of the user S.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control apparatus for a vehicle opening/closing member that operates the opening/closing member provided in the vehicle in response to a physical expression of a user, comprising:
   a user authentication unit that authenticates a user whose physical expression is to be detected;
   a physical expression detecting nit that detects the physical expression of the user;
   an operation determining unit that determines an operating state of the user authentication unit and the physical expression detecting unit; and
   a notification unit that is configured to, in accordance with a determination result of the operating state determined by the operation determining unit, send a first notification when the user has been authenticated,
   wherein, after the first notification is sent upon the user being authenticated, the notification unit is configured to send a second notification when the detection of the physical expression has been completed, and a third notification when the detection of the physical expression has failed,
   wherein the first notification, the second notification, and the third notification are distinct from each other.

2. The control apparatus for a vehicle opening/closing member as claimed in claim 1, wherein, when the operation determining unit determines the operation start of at least one of the user authentication unit and the physical expression detecting unit, the notification unit sends notification of the operation start determined by the operation determining unit.

3. The control apparatus for a vehicle opening/closing member as claimed in claim 2, wherein, when the operation determining unit determines the operation completion of at least one of the user authentication unit and the physical expression detecting unit, the notification unit sends notification of the operation completion determined by the operation determining unit.

4. The control apparatus for a vehicle opening/closing member as claimed in claim 2, wherein, when the operation determining unit, after determining the operation start at least one of the user authentication unit and the physical expression detecting unit, determines interruption of the operation, the notification unit sends notification of the operation interruption determination by the operation determining unit.

5. The control apparatus for a vehicle opening/closing member as claimed in claim 2,
   wherein the user authentication unit comprises a portable device authentication unit that authenticates a portable device carried by the user, and a portable device position detection unit that detects a position of the portable device,
   wherein the operation determining unit determines the completion of the operation of the user authentication unit when the position of the portable device detected by the portable device position detecting unit is located within a predetermined area and the authentication of the portable device by the portable device authentication unit is completed.

6. The control apparatus for a vehicle opening/closing member as claimed in claim 1, wherein, when the operation determining unit determines the operation completion of at least one of the user authentication unit and the physical expression detecting unit, the notification unit sends notification of the operation completion determined by the operation determining unit.

7. The control apparatus for a vehicle opening/closing member as claimed in claim 6, wherein, when the operation determining unit, after determining the operation start at least one of the user authentication unit and the physical expression detecting unit, determines interruption of the operation, the notification unit sends notification of the operation interruption determination by the operation determining unit.

8. The control apparatus for a vehicle opening/closing member as claimed in claim 6,
   wherein the user authentication unit comprises a portable device authentication unit that authenticates a portable device carried by the user, and a portable device position detection unit that detects a position of the portable device,
   wherein the operation determining unit determines the completion of the operation of the user authentication unit when the position of the portable device detected by the portable device position detecting unit is located within a predetermined area and the authentication of the portable device by the portable device authentication unit is completed.

9. The control apparatus for a vehicle opening/closing member as claimed in claim 1, wherein the operation determining unit determines an operation start and completion of the user authentication unit, and, during a period between the operation start determination and the operation completion determination, the notification is continued.

10. The control apparatus for a vehicle opening/closing member as claimed in claim 9, wherein, when the operation determining unit, after determining the operation start at least one of the user authentication unit and the physical expression detecting unit, determines interruption of the operation, the notification unit sends notification of the operation interruption determination by the operation determining unit.

11. The control apparatus for a vehicle opening/closing member as claimed in claim 9,
   wherein the user authentication unit comprises a portable device authentication unit that authenticates a portable device carried by the user, and a portable device position detection unit that detects a position of the portable device,
   wherein the operation determining unit determines the completion of the operation of the user authentication unit when the position of the portable device detected by the portable device position detecting unit is located within a predetermined area and the authentication of the portable device by the portable device authentication t nit is completed.

12. The control apparatus for a vehicle opening/closing member as claimed in claim 1, wherein the operation determining unit determines an operation start and completion of the physical expression detecting unit, and, during a period between the operation start determination and the operation completion determination, the notification is continued.

13. The control apparatus for a vehicle opening/closing member as claimed in claim 12, wherein, when the operation determining unit, after determining the operation start at least one of the user authentication unit and the physical expression detecting unit, determines interruption of the operation, the notification unit sends notification of the operation interruption determination by the operation determining unit.

14. The control apparatus for a vehicle opening/closing member as claimed in claim 12,
wherein the user authentication unit comprises a portable device authentication unit that authenticates a portable device carried by the user, and a portable device position detection unit that detects a position of the portable device,
wherein the operation determining unit determines the completion of the operation of the user authentication unit when the position of the portable device detected by the portable device position detecting unit is located within a predetermined area and the authentication of the portable device by the portable device authentication unit is completed.

15. The control apparatus for a vehicle opening/closing member as claimed in claim 1, wherein, when the operation determining unit, after determining the operation start at least one of the user authentication unit and the physical expression detecting unit, determines interruption of the operation, the notification unit sends notification of the operation interruption determination by the operation determining unit.

16. The control apparatus for a vehicle opening/closing member as claimed in claim 15,
wherein the user authentication unit comprises a portable device authentication unit that authenticates a portable device carried by the user, and a portable device position detection unit that detects a position of the portable device,
wherein the operation determining unit determines the completion of the operation of the user authentication unit when the position of the portable device detected by the portable device position detecting unit is located within a predetermined area and the authentication of the portable device by the portable device authentication unit is completed.

17. The control apparatus for a vehicle opening/closing member as claimed in claim 1,
wherein the user authentication unit comprises a portable device authentication unit that authenticates a portable device carried by the user, and a portable device position detection unit that detects a position of the portable device,
wherein the operation determining unit determines the completion of the operation of the user authentication unit when the position of the portable device detected by the portable device position detecting unit is located within a predetermined area and the authentication of the portable device by the portable device authentication unit is completed.

18. A control apparatus for a vehicle opening/closing member that operates the opening/closing member provided in the vehicle in response to a physical expression of a user, comprising:
a user authentication unit that authenticates a user whose physical expression is to be detected;
a physical expression detecting unit that detects the physical expression of the user;
an operation determining unit that determines an operating state of at least one of the user authentication unit and the physical expression detecting unit; and
a notification unit that sends notification that, in accordance with a determination result of the operating state determined by the operation determining unit, the user has been authenticated, the detection of the physical expression has been completed, or the detection of the physical expression has failed,
wherein the user authentication unit comprises a portable device authentication unit that authenticates a portable device carried by the user, and a portable device position detection unit that detects a position of the portable device,
wherein the operation determining unit determines the completion of the operation of the authentication unit when the position of the portable device detected by the portable device position detecting unit is located within a predetermined area and the authentication of the portable device by the portable device authentication unit is completed, and
wherein after the operation determining unit has determined the operation state of the user authentication unit and the notification unit has notified of the determination result of the operating state by the operation determining unit, when the position of the portable device that is detected by the portable device position detection unit is put off the predetermined area, the notification unit sends notification that the portable device is positioned off the predetermined area.

19. A control apparatus for a vehicle opening/closing member that operates the opening/closing member provided in the vehicle in response to a physical expression of a user, comprising:
a user authentication unit that authenticates a user whose physical expression is to be detected;
a first operation determining unit that determines an operating state of the user authentication unit;
a first notification unit that is configured to, in accordance with a determination result on the operating state the user authentication unit by the first operation determining unit, to send a first notification that the user is authenticated;
a physical expression detecting unit that detects the physical expression of the user in response to the first notification; and
a second notification unit that is configured to, in accordance with a determination result of the operating state determined by the operation determining unit physical expression detecting unit, a second notification when the detection of the physical expression has been completed, and a third notification when the detection of the physical expression has failed,
wherein the first notification, the second notification, and the third notification are different from each other.

* * * * *